84-424

EXAMINER

March 1, 1955

H. A. JEWETT

KEYBOARD AND ACCESSORIES

Re. 23,956

Orig. 2675,729

Original Filed Jan. 15, 1951

17 Sheets-Sheet 1

INVENTOR

Harold A. Jewett.

March 1, 1955 H. A. JEWETT Re. 23,956

KEYBOARD AND ACCESSORIES

Original Filed Jan. 15, 1951 17 Sheets-Sheet 2

INVENTOR

Harold A. Jewett.

March 1, 1955 H. A. JEWETT Re. 23,956

KEYBOARD AND ACCESSORIES

Original Filed Jan. 15, 1951 17 Sheets-Sheet 3

INVENTOR

Harold A. Jewett.

March 1, 1955

H. A. JEWETT

Re. 23,956

KEYBOARD AND ACCESSORIES

Original Filed Jan. 15, 1951

17 Sheets-Sheet 4

INVENTOR

Harold A. Jewett.

March 1, 1955

H. A. JEWETT

KEYBOARD AND ACCESSORIES

Re. 23,956

Original Filed Jan. 15, 1951

17 Sheets-Sheet 5

INVENTOR

Harold A. Jewett.

INVENTOR

Harold A. Jewett.

INVENTOR

Harold A. Jewett.

March 1, 1955 H. A. JEWETT Re. 23,956
KEYBOARD AND ACCESSORIES
Original Filed Jan. 15, 1951 17 Sheets-Sheet 8
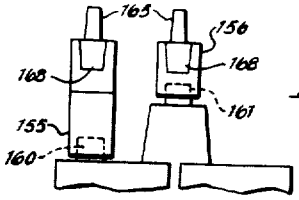
FIG. 36.
FIG. 35.
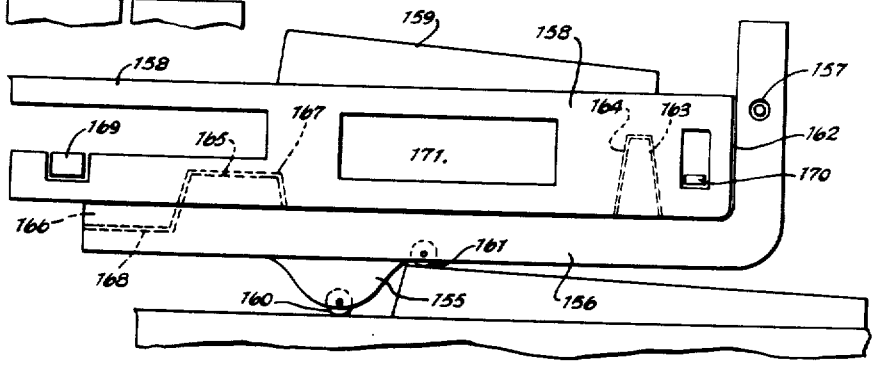
FIG. 37.
FIG. 38.
FIG. 39.
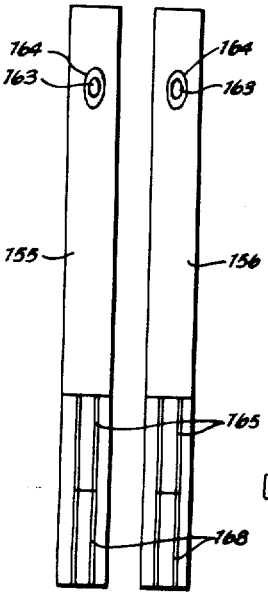
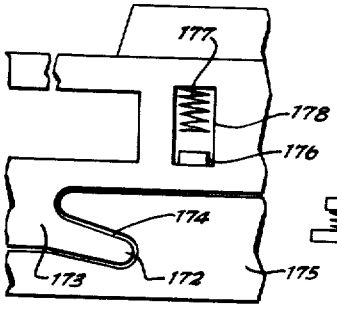
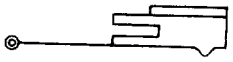
FIG. 40.
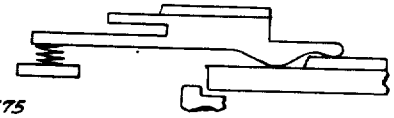
FIG. 41.
FIG. 42.
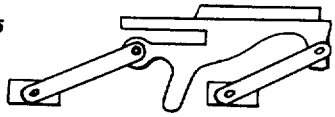
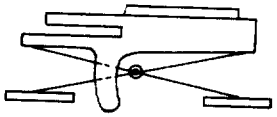
FIG. 44.
FIG. 43.
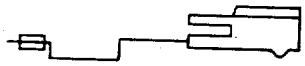
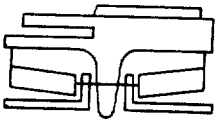
INVENTOR
Harold A. Jewett.

March 1, 1955

H. A. JEWETT

KEYBOARD AND ACCESSORIES

Re. 23,956

Original Filed Jan. 15, 1951

17 Sheets-Sheet 9

INVENTOR

Harold A. Jewett.

INVENTOR

Harold A. Jewett.

March 1, 1955 H. A. JEWETT Re. 23,956

KEYBOARD AND ACCESSORIES

Original Filed Jan. 15, 1951 17 Sheets-Sheet 11

INVENTOR

Harold A. Jewett.

March 1, 1955

H. A. JEWETT

KEYBOARD AND ACCESSORIES

Re. 23,956

Original Filed Jan. 15, 1951

17 Sheets-Sheet 12

INVENTOR

Harold A. Jewett.

March 1, 1955 H. A. JEWETT Re. 23,956

KEYBOARD AND ACCESSORIES

Original Filed Jan. 15, 1951 17 Sheets-Sheet 13

INVENTOR

Harold A. Jewett.

March 1, 1955
H. A. JEWETT
KEYBOARD AND ACCESSORIES
Re. 23,956
Original Filed Jan. 15, 1951
17 Sheets-Sheet 14
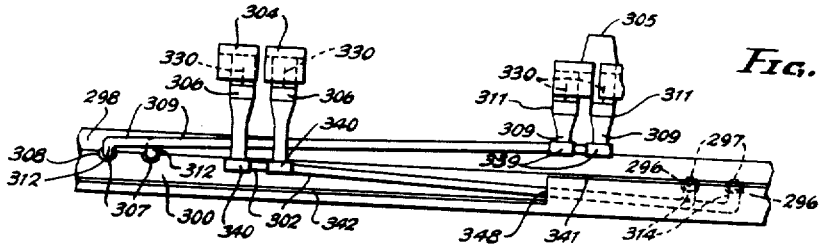
FIG. 75.
FIG. 85.
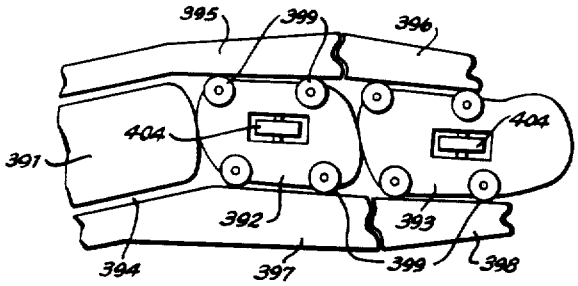
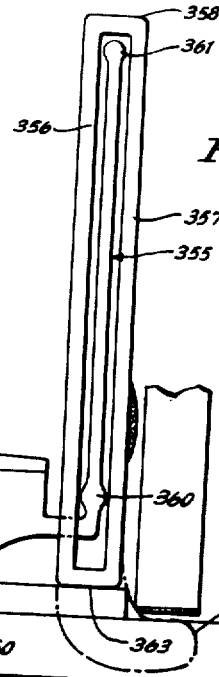
FIG. 80.
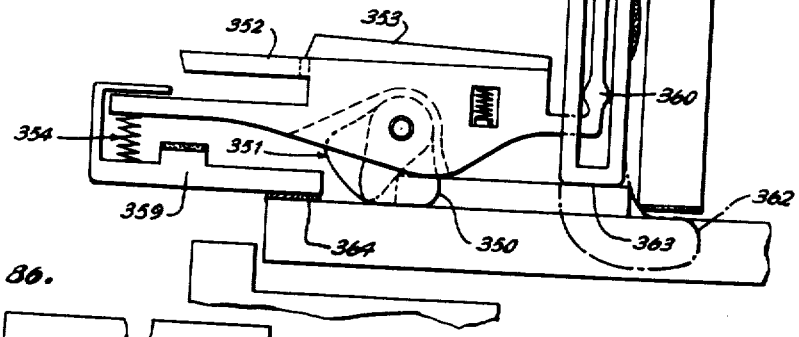
FIG. 86.
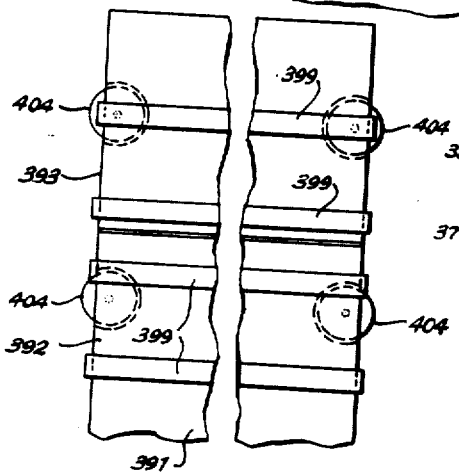
FIG. 82.
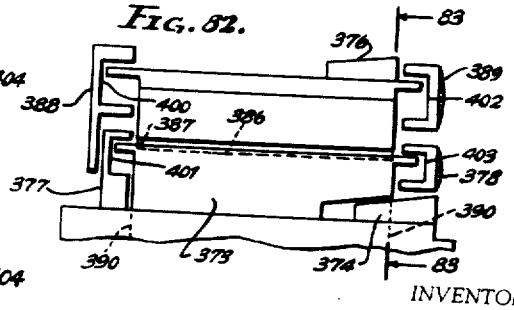
INVENTOR
Harold A. Jewett.

March 1, 1955

H. A. JEWETT

Re. 23,956

KEYBOARD AND ACCESSORIES

Original Filed Jan. 15, 1951

17 Sheets-Sheet 15

INVENTOR

Harold A. Jewett.

March 1, 1955

H. A. JEWETT

KEYBOARD AND ACCESSORIES

Re. 23,956

Original Filed Jan. 15, 1951

17 Sheets-Sheet 16

INVENTOR

Harold A. Jewett.

INVENTOR

Harold A. Jewett.

United States Patent Office

Re. 23,956

Reissued Mar. 1, 1955

23,956

KEYBOARD AND ACCESSORIES

Harold A. Jewett, Washington, D. C.

Original No. 2,675,729, dated April 20, 1954, Serial No. 206,100, January 15, 1951. Application for reissue July 21, 1954, Serial No. 444,936

25 Claims. (Cl. 84—424)

Matter enclosed in heavy brackets [ ] appears in the original patent but forms no part of this reissue specification; matter printed in italics indicates the additions made by reissue.

This application is a continuation-in-part of applications S. N. 59,512, filed November 12, 1948; S. N. 120,135, filed October 7, 1949; and S. N. 138,424, filed January 13, 1950, respectively referred to below as '512, '135, and '424.

The invention relates to keyboards and keys, key actions, supports and other appurtenances thereto of musical instruments of the piano, organ etc. type, especially to keyboards that are operatively shiftable over or in relation to a bench of tone actuator contact elements where either the keys or such elements themselves embody or are provided with key return means (e. g. springs, hammer action weighted levers or links, or etc., such means being referred to generically below as key returners) to serve as mechanical or automatic transposers, or keyboards that are equipped with their own tone producer connections to serve as independent auxiliary keyboards in proximity to, e. g. overlying the rear portion of, a manual of a host instrument.

Conventional piano and organ keys ordinarily reciprocate on rearwardly located fulcrums providing axes of rotation parallel to their keyboard. To give a reasonably workable amount of key drop at the rear of the ivories these fulcrums need to be located a proportionate distance back, but even so the drop at the ivory rear is usually less than half that at the front, say, of a white ivory, consequently calling for more than double the amount of finger force to yield a given volume of piano tone. Various prior art solutions have been offered for this disparity per se, but none it seems which has presented automatic transposer utility as an inherent by-product, or concomitantly effected a major saving in bulk and weight as well, via inherent and marked lessening of the overall front to rear dimension requirements of the instrument.

The ordinary piano or organ manual has a riser, fall board or other structure at its immediate rear which precludes the placing of an auxiliary keyboard in operative position above it without locating the auxiliary keys' fulcrums forwardly of such structure, thereby occasioning aggravated need for improved ivory drop or touch equalization in their case. And the situation is still further aggravated when the auxiliary keys are used as transposer (hereinafter abbreviated to tr.) keys to transmit finger pressure to host ivories via prior art devices in the form of "leveling up" pins, "flexures," blocks or analogous structures placed over host white ivories (or black ones too) for equalizing the level of the host key tops (such devices being hereinafter designated levelizers). This is because of friction at the points of downpusher contact consequent on differentials of arcuate motion, and is conducive to wear, noise, etc.

Prior art supports for auxiliary tr. or other keyboards have generally entailed more or less alteration, derangement and/or defacement of external host casing or console surfaces ("console" being used herein to designate the casing structure surrounding or adjacent the manual or manuals of any instrument of the piano or organ type), while materials used for the frame and action parts appear to have been far inferior to analogous ones of recent development.

As used herein, "rearward," back," or etc., and "frontward," "forward," or etc., will have reference to the manual or console rather than to the player or his fingers.

Along with the objects stated in the parent applications the invention has as objects the provision of novel means or novel combinations of means:

To remedy the foregoing and other shortcomings of the prior art;

To avoid or lessen the degree of counterclockwise (as viewed from the treble end of the keyboard) arcuateness of drop of points of finger pressure on conventional tr. key ivories, where such drop approaches zero in amount as the distance from such points to the fulcrums of the keys lessens;

To impart to tr. keys appreciable drop at the rear of the front to rear axes of their ivory topped portions in response to down pressure at the rear of their ivories;

To impart to tr. ivories a drop at their rear, in response to down pressure thereon, equal to ⅓ (advantageously ⅔, ½ or more) the maximum drop along the ivories;

To both locate white tr. ivory rears less than about ½ (advantageously ¼ or less) their ivory lengths forward of the vertical plane in which the rears of the axes of the ivory topped portions of their keys lie and impart substantial drop to the rears of said portions in response to down pressure on the ivory rears;

To impart to piano and organ keys generally, whether or not tr. ones and particularly those in gangs comprising white keys having ivory lengths of at least 2½ (better 3) inches, a drop characterized by motion of the rear of the ivory, in response to pressure on it, along a path that is essentially either vertical or comprises laterally and/or rearwardly facing arcuateness or convexity;

To communicate down motion of ivories to tone actuator contact elements in such manner that simple shifting of a bench of the ivories in chromatic, hereinafter abbreviated to $$\frac{\text{oct}}{12}$$

increments along a bench of such elements will provide for automatic transposition, with the line of the rears of said elements, in case they also function as key returners (e. g. as when they are hammer action weighted levers) lying forwardly of a vertical plane located ¾ (better ½, ¼ or still less) of a white ivory length to the rear of the vertical plane in which the rears of the white ivories lie;

To minimize the amount, depth, space requirements and complexity of action mechanism underlying the ivories;

To minimize friction and sticking of action parts, and noisiness of pedals as well as manuals ("manual" or "keyboard," "ivory," "finger" pressure etc. being used herein to include pedalboard, pedals, foot pressure etc., unless otherwise apparent);

To effect automatic pedalboard transposition;

To use keyboards of pre-built instruments as racks, and seams or channels alongside their keys as spacers, so as to convert such instruments into plural (or more plural) manual ones via installation of auxiliary keyboards (e. g. having their own tone producer accessories) in association with them;

To removably secure auxiliary keyboards (whether independent or tr.) or segments of them (if desired with longitudinal extensibility sufficient for adjustment to any octave length variances from one host to another) in selected position along host manuals with a minimum or total absence of intercontact with external console surface and preferably without impeding the functioning of any host ivories, particularly of any that underlie nonterminal portions of such keyboards; also without impeding the shifting of host grand piano keyboards incident to use of their soft pedals;

To use the collective hold-up force of host keys not only to sustain auxiliary tr. keyboards or segments of them but also to sustain upstop and/or downstop members common to the latters' keys;

To facilitate the piloting of auxiliary keyboards or segments of them into desired positions along host manuals;

To provide for installation and/or de-installation of such keyboards on ordinary pianos and organs generally, by a minimum of simple movements—optionally by just one;

To use wall surfaces of host casings and/or keys as anchor means to prevent longitudinal and/or front to rear displacement, as well as tilting, of such keyboards;

To provide antifriction or self-lubricating surfacing (e. g. of nylon) at bearing and moving contact areas, thus giving them susbtantially endless mechanical life without need for lubrication or other servicing.

To provide portable auxiliary keyboards characterized by ruggedness and durability and comprising materials of high strength-to-weight ratio and war and corrosion resistance, for withstanding vigorous playing over long periods of use;

To supply a case for protecting auxiliary keyboards or portions of them during non-use; and To provide keyboard instruments comprising in-built benches of tone actuators and in-built benches of keys operatively associated with them, said instruments embodying the novel action and space economies of the invention.

Other objects will appear below.

The objects of the invention are accomplished by use of means described or identified herein and/or in the parent applications, e. g. as follows:

Achievement of the objects relative to tr. key actions may be accomplished by so fulcruming the [*tr.*] keys laterally and/or forwardly and/or upwardly of the loci of usual key lever fulcrums that when pressure is exerted on their rears to secure a desired amount of drop of such rears it is accompanied by lessening or avoidance of the counter-clockwise (viewed from treble) or forward arcing that characterizes the usual ivory drop; or so that such drop follows a path that is essentially either vertical or clockwisely (viewed from treble) arcuate, or laterally and/or rearwardly arcuate or convex in nature. As an illustration, the ivories may be carried by keys fulcrumed forwardly so as to have axes of rotation frontwardly of and parallel to the keyboard with pressure on the rears of the ivories producing an even greater drop than at their fronts. Or novel use of prior art "parallel motion" mechanisms may be made.

Achievement of the objects of the invention relative to piano and organ key actions generally may also be accomplished by use of keys fulcrumed as just stated, or by mounting the ivories on the "handles" of crank-like or cane-like keys which, while pivoted for imparting free reciprocation to the ivories, are nevertheless up-stopped, down-stopped, distortion-proofed (by inherent rigidity, supplemented against extraordinary forces by appropriate wall structure) and clearanced for operatively contacting tone actuator elements and/or key returners associated with them.

Achievement of susbidiary tr. key action objects is exemplified by application of drop equalization directly to levelizers, so that on merely setting a bench of loosely captive form-fit tr. keys down on a bench of the levelizers, the keys ride as motionless passengers on, and thus receive drop equalization derivatively from them. Or the tr. keys may carry flex finger levelizers loosely pivotally connected to their bellies in manner to either serve as downpushers on host whites or be flexed out of the way by host blacks, merely via feeding of the bench into position at any desired position along a host manual. Or levelizers of the prior art may be used, but prefably with rollers or rockers supplied at downpusher contacts.

Achievement of the objects of the invention relative to key actions for auxiliary keyboards to be disposed directly above and operatively clear of the rears of host manuals may be accomplished in general by use of any actions in which the keys are fulcrumed forwardly of a vertical plane located less than the length of their white ivories (advantageously not more than ½ or ¼ such length, and preferably not to any substantial extent at all) to the rear of and parallel to the vertical plane in which the rears of such white ivories lie.

Achievement of the objects of the invention relative to portable supports involves the provision of either a single frame carrying its own support portions for seating on host instrument or other base structure or a fixed frame plus one or more shiftable frames based on it (any of such frames optionally being in sectional units or segments which may be united by longitudinal members having extensibility, stretchability, flexibility and/or elasticity as desired). Pilot spacer means in the form of downwardly reaching relatively thick ribs to overlie or seat on host white ivory rears and be closely flanked by rear portions of the sides of adjacent host black ivories, and/or thin projections, ribs or fins to freely penetrate selected key-to-key seams in the host manual, advantageously are provided at one or more intermediate loci along the frames, not only to facilitate placement of the frames in selected positions relative to the host manual but also, in the case of tr. keyboards, to make the host $$\frac{\text{oct}}{12}$$

seams serve per se as a ready index for transposition; also to provide security against displacement.

Foundation support may be derived from external console structure, e. g. the usual end or side cheek structure and/or front rail and rear riser, or via bracing of frame parts between said rail and riser, or levering them up under the riser with the front rail or key bottom as a fulcrum to provide firm support frontwardly of such fulcrum, or up-locking (e. g. by means inserted through key seams) of host keys underlying terminal portions of the auxiliary frames, or removal of one or more of such keys to expose key bottom for use as a base, and/or etc., but generally it is preferred to minimize or entirely obviate all intercontact with external console structure as well as all sacrifice or impairment of host keys' functioning while concomitantly providing security against displacement, as by using a multiplicity of support fins so thin as to fit loosely in host key-to-key or other seams yet so numerous as to provide abundant cumulative support, either via strut-like contact with host key bottom and/or lever-like fulcruming thereon as aforesaid. Advantageously stainless steel, stiff plastic (e. g. Vinylite) or the like is used for such fins, with re-enforcement via cross tie pieces.

Where substantial or total support is derived from collective hold-up force of host keys, rearward and downward locating of the frame's center-of-gravity line, plus lightening of overall frame weight, may be advantageous.

Since adaptations of the tr. key actions and associated parts to portable keyboards involves the same general principles as when they are in-built into instruments, except for added complexities due to the extra heights of black ivories of conventional hosts, the irregular shapes of their white ivories, etc., and since mere simplification therefore is generally all that is essential for converting illustrations of such adaptations into illustrations of in-built embodiments, most of the below drawings relative to the novel actions or action combinations will be of portable tr. keyboards or assocaited parts. And since provision of supports for such keyboards is a primary need, the drawings will deal first with such supports.

In the drawings (in respect to which suitable key returners and tone producer installations, if not shown, are to be understood as implied when needed; moving and bearing parts as being optionally subject to modification to give them or enhance their individual replaceability; lever, spring or other moving parts as provided, when needed, with suitable freedom of play and appropriate stop, antibacklash, damper and/or sound-absorbing means; all parts as having fitting anchorages or housing; all figures as being basically diagrammatic or schematic; and all expressions such as vertical, horizontal, downward, upward, lateral, longitudinal, etc., as being relative and approximate unless otherwise evident), to be more particularly described later on:

Figs. 1–32 are directed mainly to supports or elements of supports for the auxiliary keyboards of the invention; Figs. 33–91 to actions or elements of actions usable in them; Figs. 92–95 to pilot means for use in their installation; Fig. 96 to a portable protective case for them; and Figs. 97[91]–100 to inbuilt tr. keyboard ensembles.

More particularly:

In Figs. 1–7, which illustrate conventional piano, organ and pedal keys and keyboard structure plus the seams comprised therein that may be availed of in the practice of the invention, Figs. 1–2 are plan and front elevations of base end portions of ordinary piano or organ manuals, Fig. 3 is a treble end elevation thereof, Fig. 4 is an end elevation of a pair of manuals arranged as in an ordinary plural-manual pipe organ, and Figs. 5–7 are respectively analogous to Figs. 1–3 except for depicting an ordinary pedalboard rather than a manual keyboard;

Figure 8:
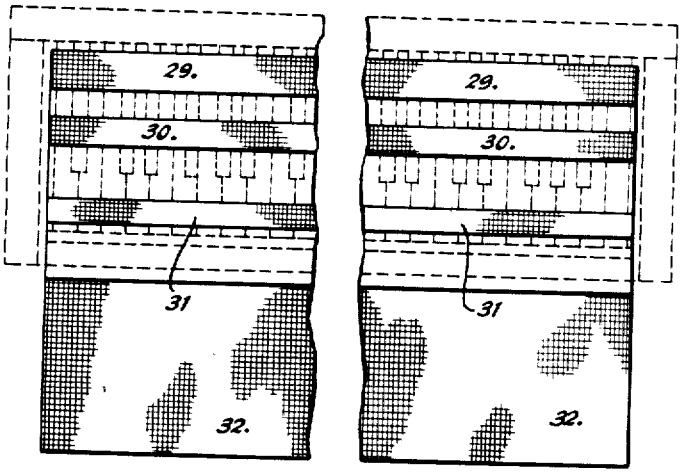
Fig. 8 is a schematic plan showing areas overlying or frontward of a conventional host manual which entail varying problems in respect of security of placement of the supports of the invention.
Figure 19:
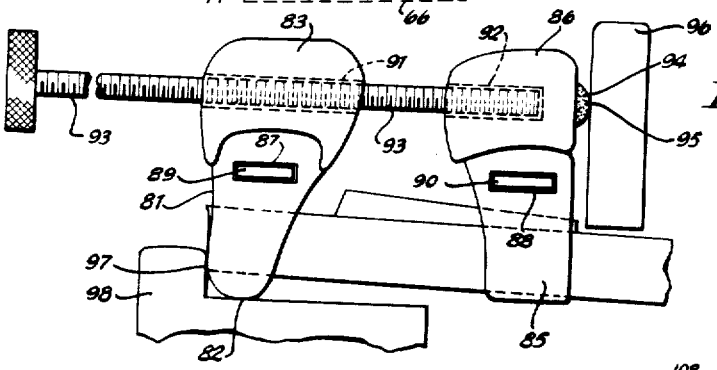
Figure 18:
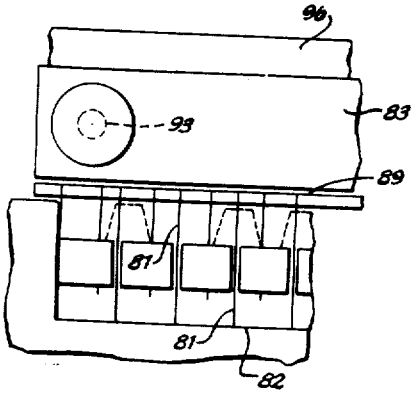
Figure 22:
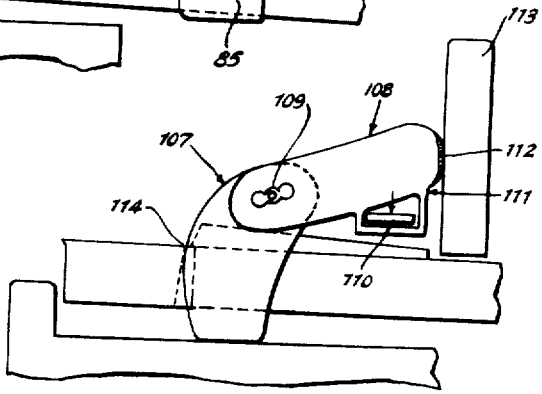
Figure 30:
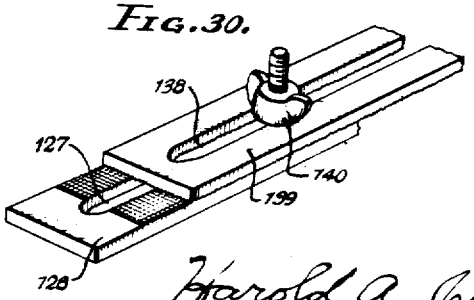
Figure 20:
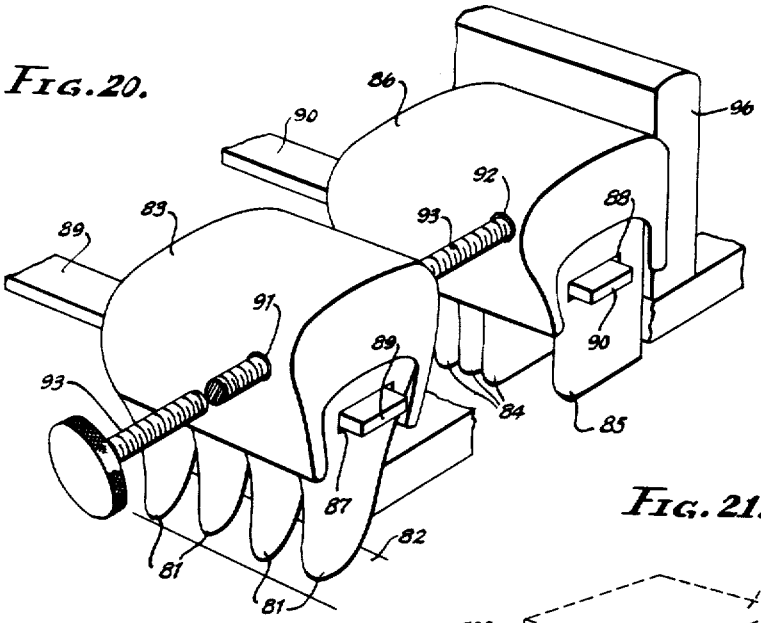
Figure 21:
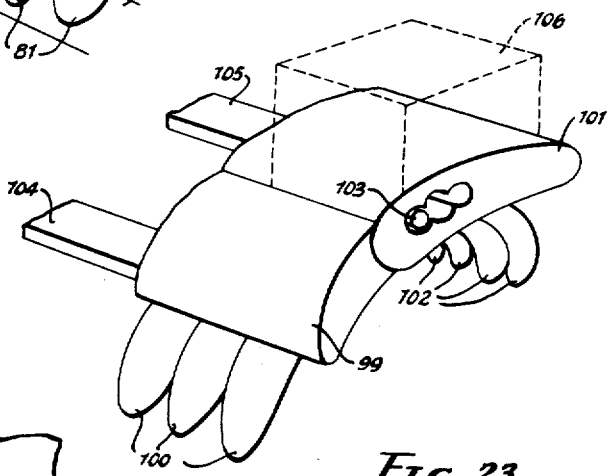
Figure 24:
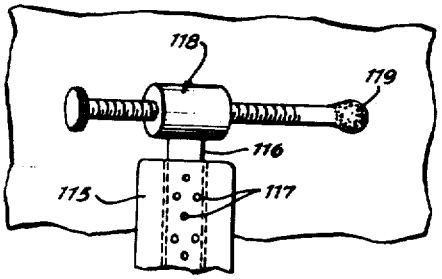
Figure 23:
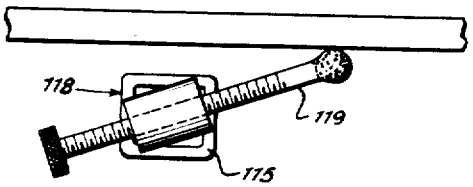
Figure 25:
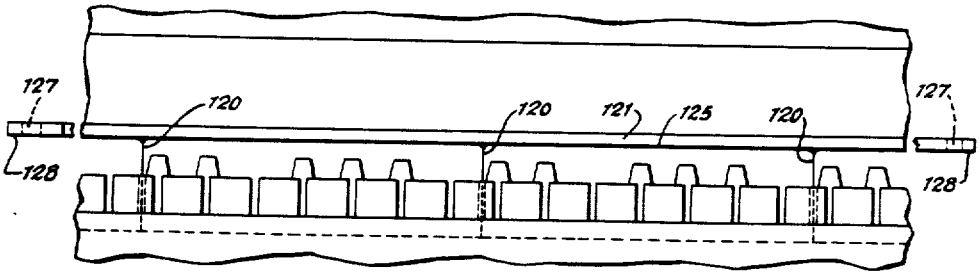
Figure 26:
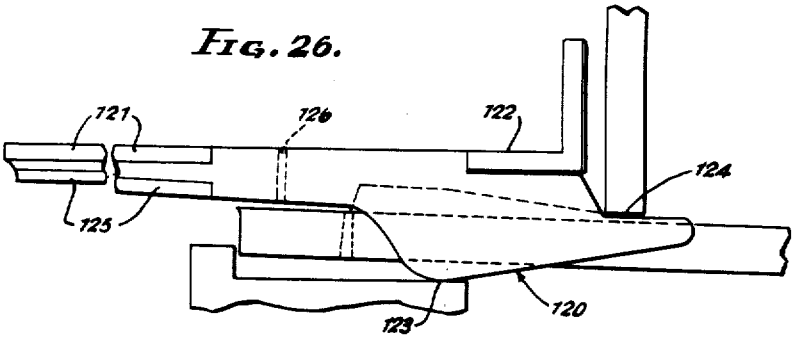
Figure 27:
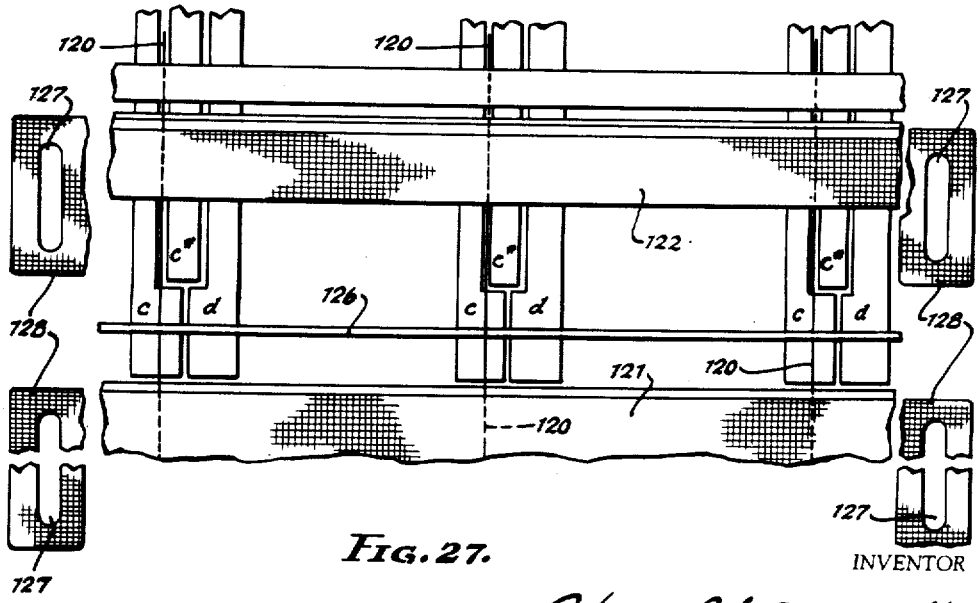
Figure 29:
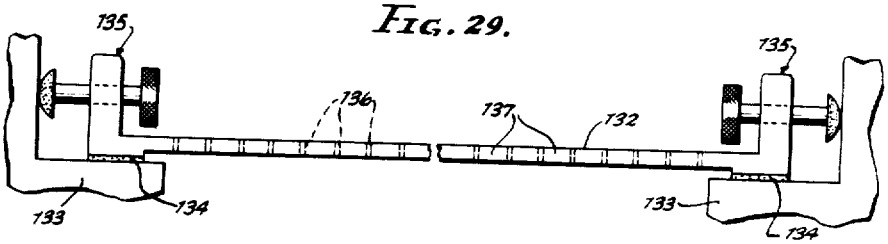
Figure 28:
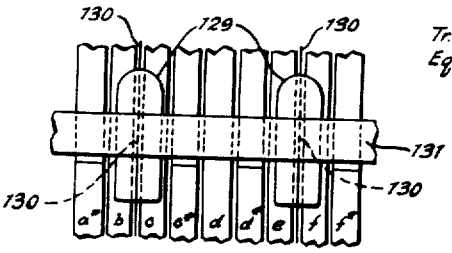
Figure 31:
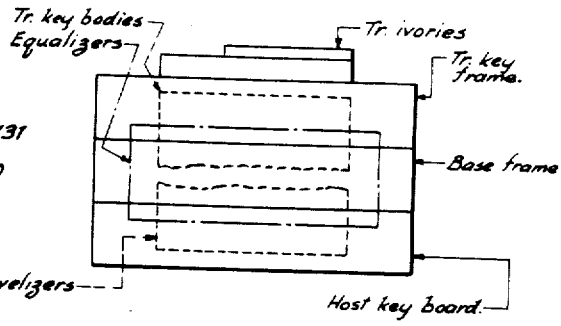
Figure 32:
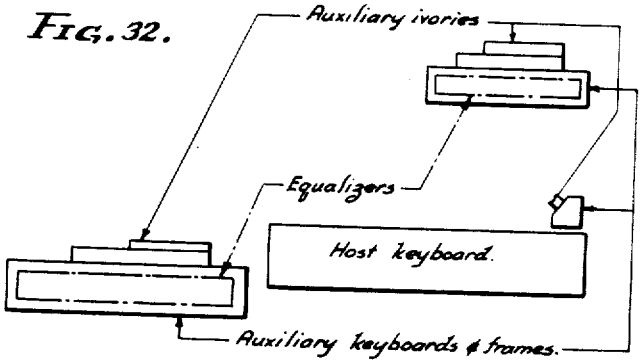
Figure 34:
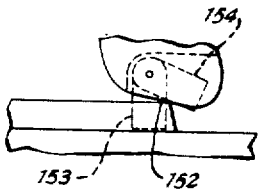
Figure 33:
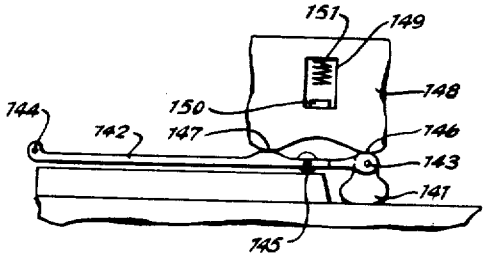

In Figs. 18–24, which illustrate the use of adjustable or self-adjusting means for bracing front parts and rear parts of the support structures against and between fixed host structure, Figs. 18–20 are respectively front and end elevations and perspective of supports so braced via screw action, Figs. 21–22 are perspective and end elevation of two varieties of supports so braced via members acting self-adjustably in the manner of "inside" calipers, and Figs. 23–24 are plan and front elevation details of a particular type of screw means suitable for adjustably effecting such bracing;

Figs. 25–27 are respectively front and end elevations and plan of a support frame in position for use, which frame carries platforms corresponding generally to certain areas shown in Fig. 8, is supported by a plurality of lever-type fins, and has terminal portions adapted to receive fastening means for tying a transposer frame to it;

Fig. 28 is a plan detail of the rear of a host keyboard having fins in its b—c and e—f seams which carry rearwardly extending stability-imparting webs;

Fig. 29 is a front elevation of a support based upon the usual side cheek structures at the ends of a host keyboard;

Fig. 30 is a perspective of the sort of fastening means referred to in connection with Figs. 25–27 above;

Fig. 31 is a schematic end elevational chart depicting relative zones of location or functioning in the case of tr. installations, of host keyboard, portable base frame, levelizers, equalizers, portable tr. keys frame, tr. key bodies and tr. ivories;

Fig. 32 is a schematic and elevational chart illustrating locations suitable for independent, non-tr., auxiliary keyboards with supports and/or actions embodying one or more elements or combinations of the invention;

Fig. 33 is an end elevation detail of novel modifications of certain prior art levelizers carrying tr. keys (the latter exaggerated);

Fig. 34 is a side detail of a form of flex finger levelizer carrying tr. key.

Figure 50:
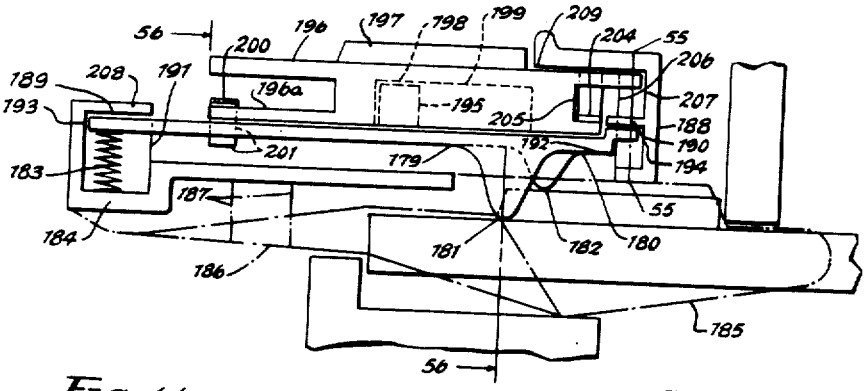
Figure 51:
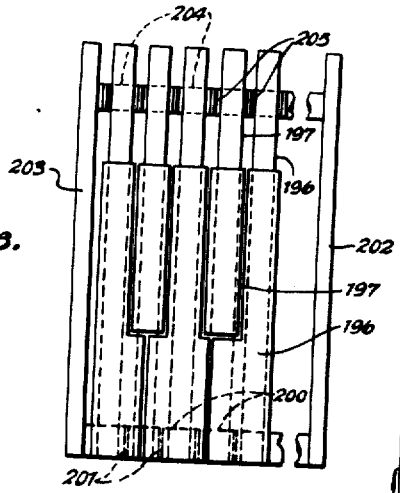
Figure 52:
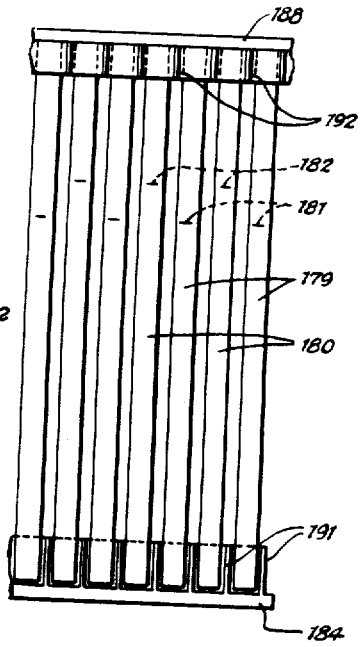
Figure 45:
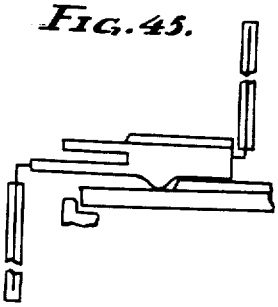
Figure 49:
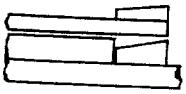
Figure 53:
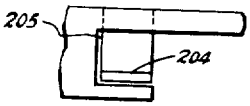
Figure 54:
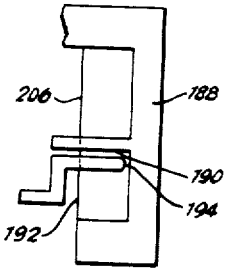
Figure 56:
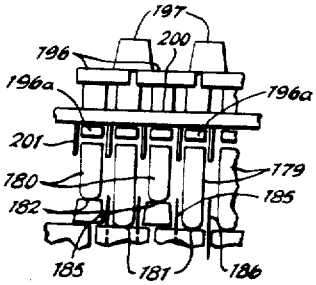
Figure 55:
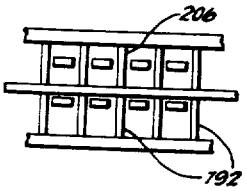
Figure 60:
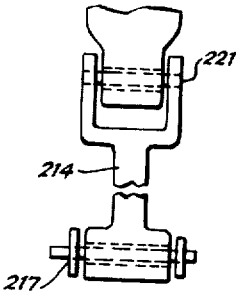
Figure 61:
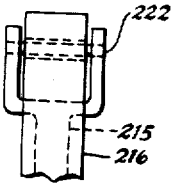
Figure 58:
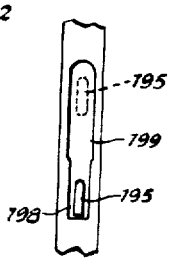
Figure 57:
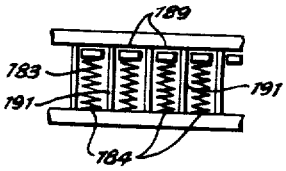
Figure 59:
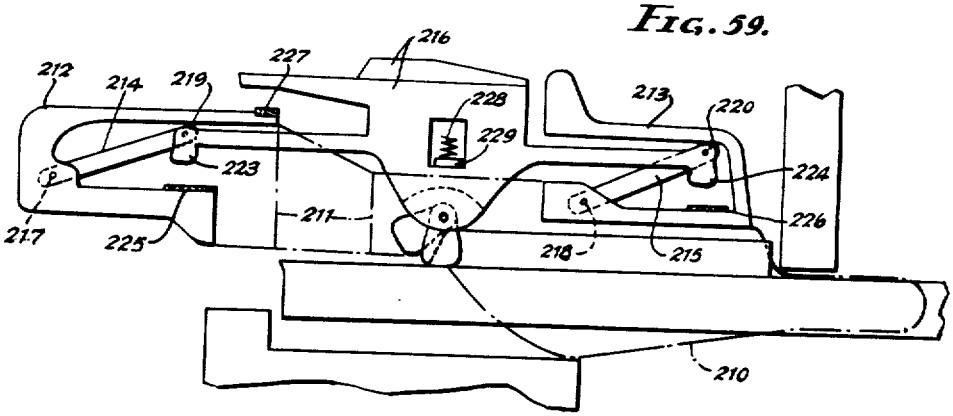
Figure 62:
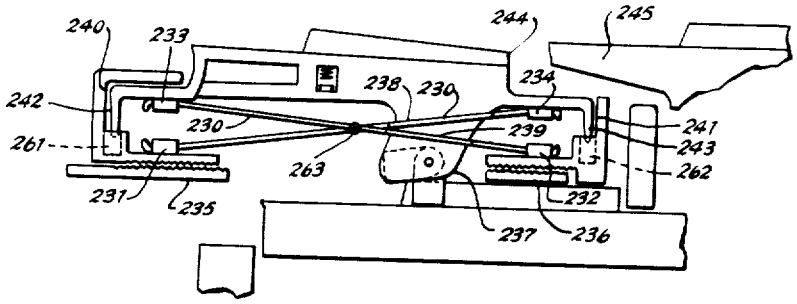
Figure 63:
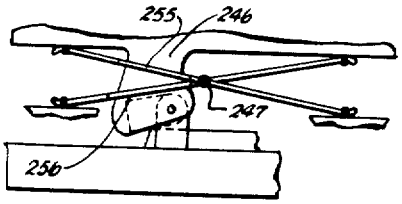
Figure 64:
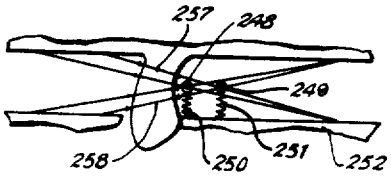
Figure 66:
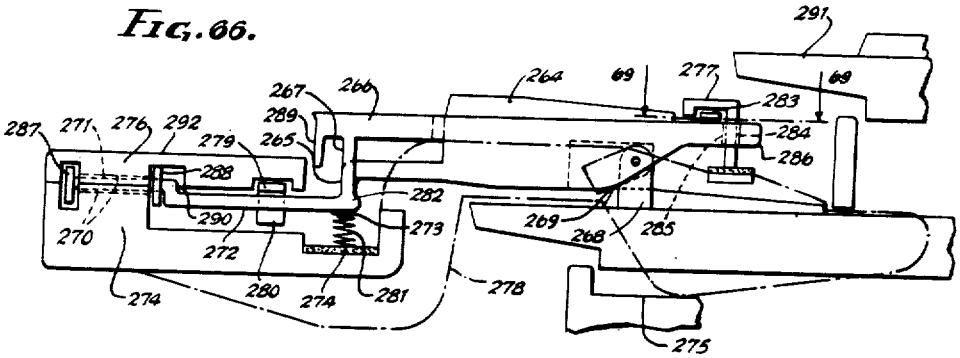
Figure 68:
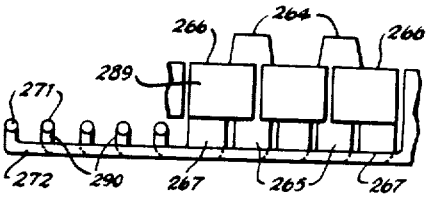
Figure 65:
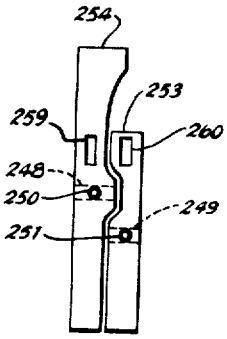
Figure 70:
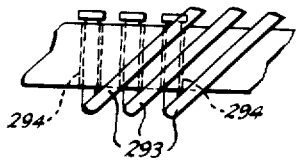
Figure 73:
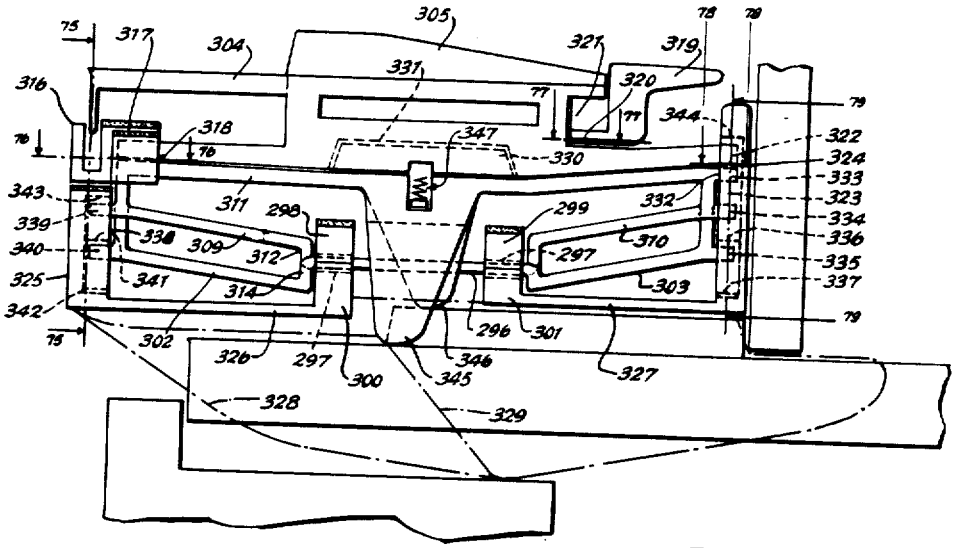
Figure 72:
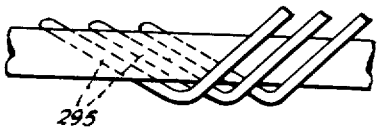
Figure 71:
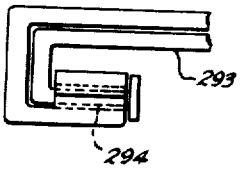
Figure 69:
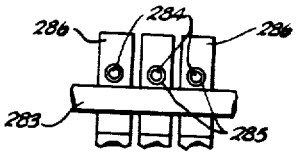
Figure 67:
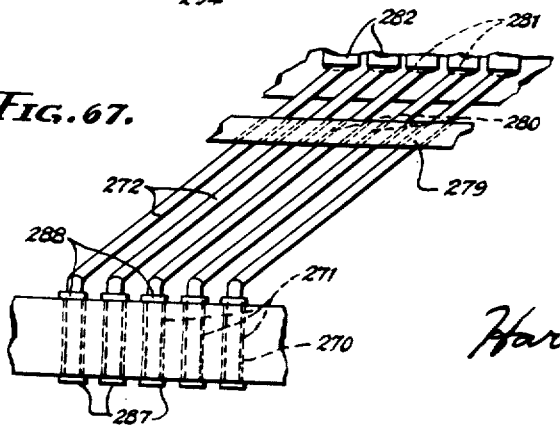
Figure 79:
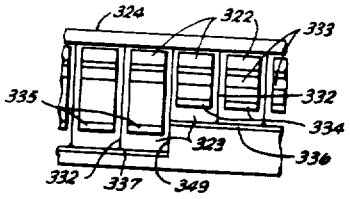
Figure 89:
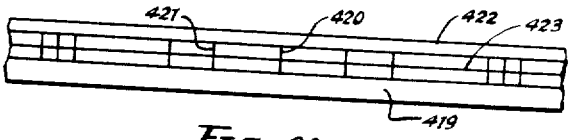
Figure 78:
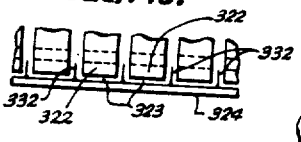
Figure 90:
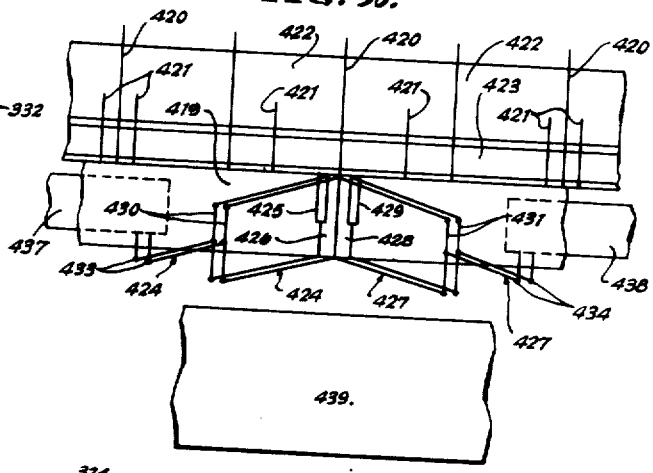
Figure 77:
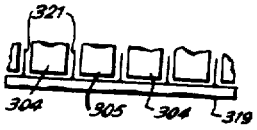
Figure 76:
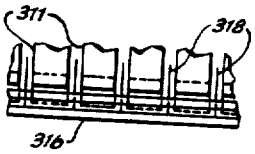
Figure 74:
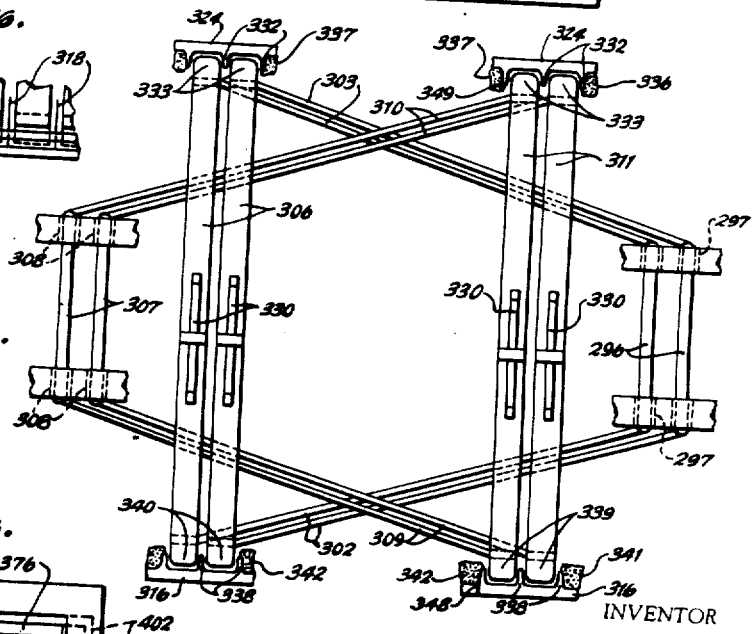
Figure 84:
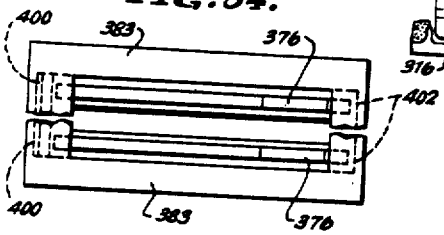
Figure 83:
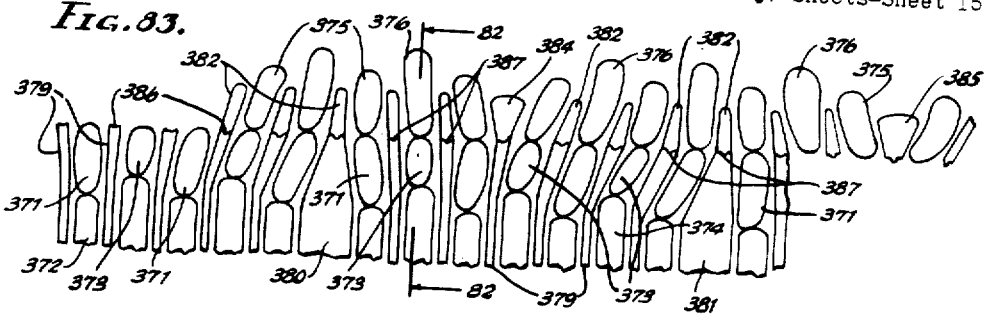
Figure 88:
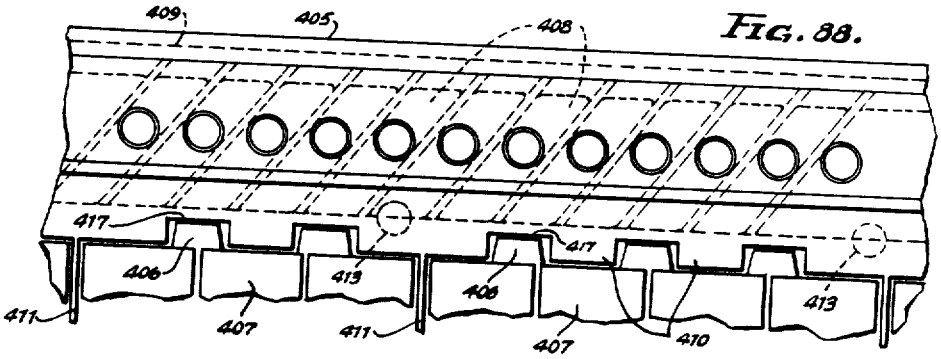
Figure 81:
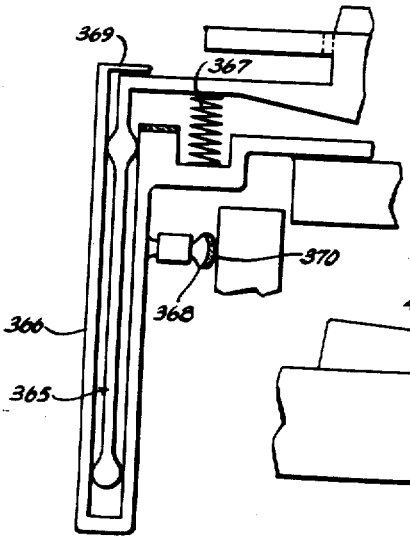
Figure 87:
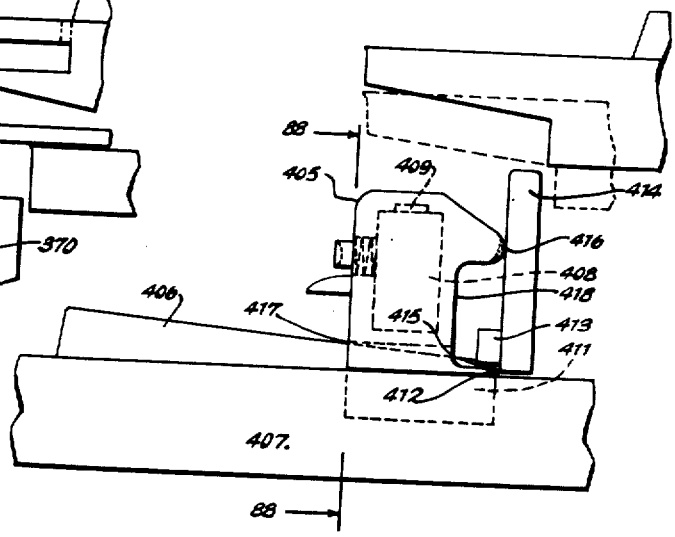
Figure 91:
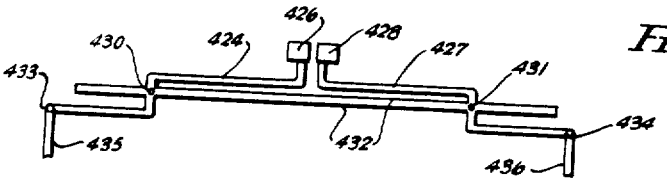
Figure 92:
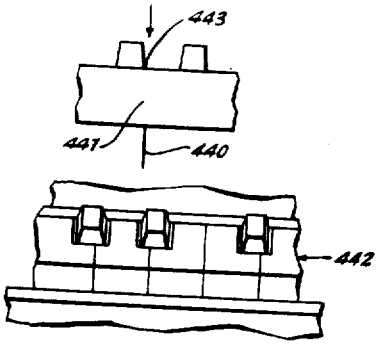
Figure 93:
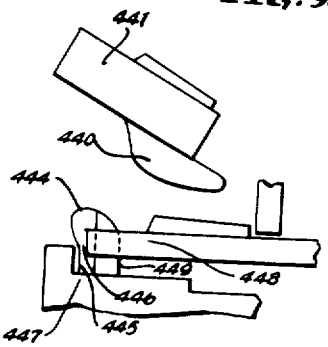
Figure 94:
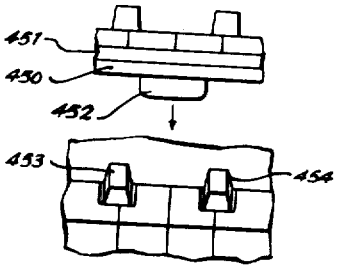
Figure 95:
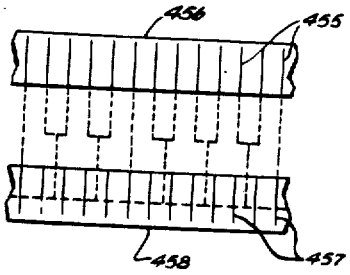
Figure 96:
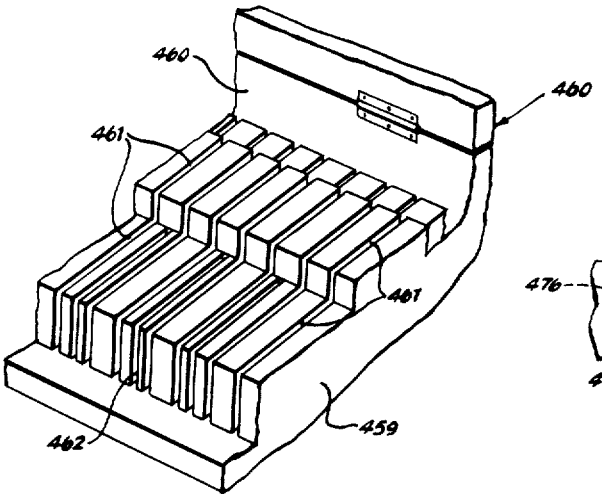
Figure 97:
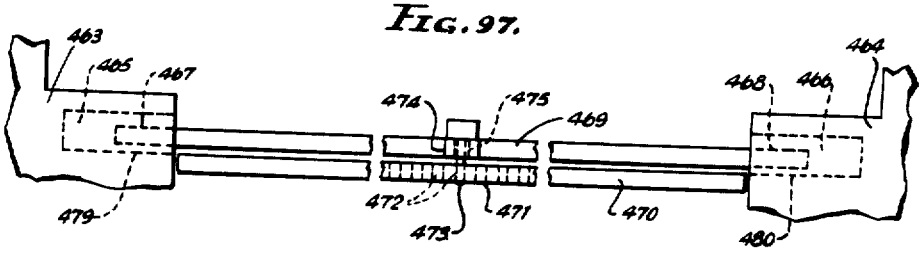
Figure 98:
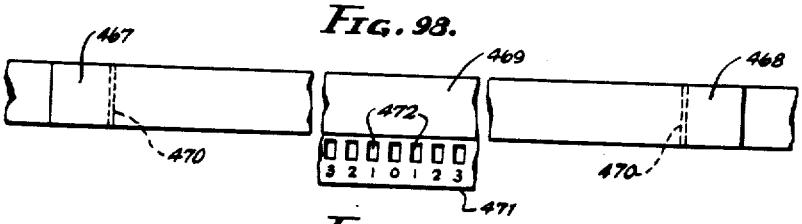
Figure 99:
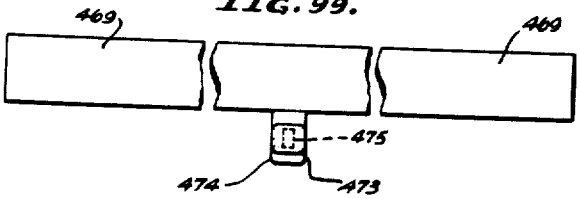

Figs. 35–37 are respectively end and front elevations and plan (with axled rear portions omitted in Figs. 36–37) of a pair of prior art swing arm key levers modified to provide identical form-fitting cradles for the tr. keys shown in Fig. 35 (but not in Figs. 36–37), the cradles concomitantly acting as levelizers for the tr. keys so that in effect a laminated or two-ply key is formed with the tr. key as the upper lamina and the levelizer as the lower lamina, with no adhesive other than gravity and free interengagement of parts to hold them together and with the upper lamina receiving its drop equalization solely from that of the lower one;

Fig. 38 is an end elevation detail of a modified portion of the tr. keys and levelizers structure of Fig. 35;

Figs. 39–49 are schematic representations of various types of key actions, a number of them believed novel per se, which are adaptable as hereinafter detailed for use in the practice of the invention;

Fig. 50 is an end elevation of a host keyboard provided with a tr. keyboard embodying the Fig. 40 type of key action as well as the two-ply principle of Fig. 35;

Fig. 51 is a plan of the tr. keyboard of Fig. 50 with upper front and rear frame structure and levelizers omitted;

Fig. 52 is a plan of the levelizers of Fig. 50 and portions of their frame;

Fig. 53 is a side elevation detail of the rear of the Fig. 50 tr. keys and their frame;

Fig. 54 is a corresponding detail of the rear of the Fig. 52 levelizers and their frame;

Fig. 55 is a section on the line 55—55 of Fig. 50;

Fig. 56 is a section on the line 56—56 of Fig. 50;

Fig. 57 is a front elevation detail of the spring-supported front ends of the levelizers of Fig. 52;

Fig. 58 is a plan detail of a horizontal section of complementary slot and vane stabilizer structures respectively carried by the Figs. 50–52 keys and levelizers;

Fig. 59 is an end elevation of a host keyboard provided with a tr. keyboard embodying the Fig. 41 type of key action;

Fig. 60 is a diagrammatic detail of the front joints and connections of the Fig. 59 tr. key action;

Fig. 61 is a corresponding detail of the upper rear joint and connections of said key action, the lower rear joint and connections being the same as in Fig. 60;

Fig. 62 is an end elevation of a host keyboard provided with a tr. keyboard embodying the Fig. 42 type of key action;

Figs. 63 and 64 are side elevation details of modified forms of the Fig. 62 type of key;

Fig. 65 is a plan diagram of a pair of Fig. 64 keys with their ivory top portions omitted;

Fig. 66 is an end elevation of a host keyboard provided with a tr. keyboard embodying the Fig. 43 type of key action;

Figs. 67–68 are respectively plan and front elevation details of key equalizer and action portions of Fig. 66, but with ivory and certain casing parts omitted from Fig. 67 and casing parts omitted from Fig. 68;

Fig. 69 is a plan detail on the line 69—69 of Fig. 66;

Figs. 70–71 are diagrammatic plan and side elevation details of an alternative design of fulcrum and anchorage structure for the equalizers of Fig. 66, outside casing structure being omitted in Fig. 70;

Fig. 72 is a diagrammatic plan of a further such alternative design;

Fig. 73 is an end elevation of a host keyboard provided with a tr. keyboard embodying the Fig. 44 type of key action as well as the two-ply or cradled key principle of Fig. 35;

Fig. 74 is a plan, on reduced scale, of two illustrative pairs of the Fig. 73 levelizers, their equalizers being disposed in accordance with the nesting plus clearancing and reverse tiering principles developed in '512 and '135;

Fig. 75 is a reduced scale front elevation detail on line 75—75 of Fig. 73, of certain of the Fig. 74 parts;

Figs. 76–79 are reduced scale details on lines 76—76; 77—77; 78—78; and 79—79, respectively, of Fig. 73, Figs. 76–78 being plan and Fig. 79 elevation;

Fig. 80 is an end elevation of a host keyboard provided with a tr. keyboard embodying a combination of the Fig. 40 type of key action and the one particularly exemplified in Figs. 54–55 of '512, besides using the pivotally suspended flex finger levelizers of '424 in optionally relatively large size;

Fig. 81 is a form of the front portion of Fig. 80 modified to embody the Fig. 45 type of key action;

Fig. 82 is an elevation on the line 82—82 of Fig. 83 of a host pedalboard provided with the Fig. 49 type of pedalboard transposer action, which in turn embodies the two-ply or laminated key principle of Fig. 35;

Fig. 83 is a section on line 83—83 of Fig. 82;

Fig. 84 is a plan detail of a g-flat to g-flat octave-long embodiment of the Fig. 82 tr. pedalboard;

Fig. 85 is an enlarged front elevation of one of the host black pedals of Fig. 83 and the levelizer and tr. pedal members in position over it, said members being confined within adjacent chute-forming structure and equipped with optional rollers;

Fig. 86 is a side elevation of the pedal members and leverizer of Fig. 85 but with the chute structure omitted;

Figs. 87–88 are end and front elevations of an independent auxiliary keyboard sustained solely by collective hold-up force of host pipe organ keys, and adapted in contour to seat on the rear of the host manual without interference from either the usual registration pistons or the action of overhanging keys of the manual next above;

Fig. 89 is a diagrammatic front elevation of an independent auxiliary keyboard positioned frontwardly of a host manual and having spacer fins extending rearwardly from its frame into seams of the latter;

Fig. 90 is a plan diagram of the combination shown in Fig. 89, but with organ bench and two illustrative pairs of keys added, such pairs having equalizers respectively diverging from a host mid-seam to serve spaced base and treble piano sounding units in such manner as to leave ample knee, leg and arm space for simultaneously playing on both keyboards and a usual host pedalboard;

Fig. 91 is a diagrammatic front elevation of the inner ones of each of the Fig. 90 pairs of keys;

Fig. 92 is a front view of a midportion of a unitary tr. keyboard in the course of being installed on a host manual, the ensemble being viewed from the plane of the tr. keyboard and the latter carrying a pilot fin for knifing into whichever $$\frac{\text{oct}}{12}$$

host seam may correspond to the particular degree of transposition desired:

Fig. 93 is an end view of the ensemble of Fig. 92 but from the plane of the host manual and with a pre-placed strut-based fixed frame added to overlie front portions of host white ivories;

Fig. 94 is analogous to Fig. 92 except that the tr. keyboard is not unitary but has been pre-secured in desired transpositional position on a portable under frame which carries a pilot rib of suitable width and shortness to be closely flanked by rearward portions (only) of the host black ivories appearing in the drawing (i. e. when set in position to overlie or seat upon rear portions of the white ivories separating them);

Fig. 95 is a plan of front and rear fixed support platforms in position over a host manual, each of the platforms having $$\frac{\text{oct}}{12}$$

tr. index slits occupying the same vertical planes as host $$\frac{\text{oct}}{12}$$

seams below them;

Fig. 96 is a perspective detail of a form-fit case having a bed of suitable design, and containing appropriately spaced seams, for receiving and safeguarding spacer fins of auxiliary keyboards carried or stored in it;

Fig. 97 is a schematic front elevation of an instrument containing an in-built tr. keyboard operatively positioned over an in-built bench of key returners, the instrument having base and housing structure beyond each end of said bench to accommodate the ends of the keyboard over a transpositional range of, e. g., up to six chromatic intervals either way;

Fig. 98 is a plan of Fig. 97 but with upper portions of the housing structure and the midportion of the tr. keyboard omitted;

Fig. 99 is a plan of the tr. keyboard of Fig. 97; and

Figure 100:
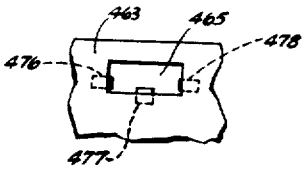

Fig. 100 is an end elevation interior detail of housing structure such as that of Fig. 97 but with optional rollers provided to facilitate axial shifting of the tr. keyboard.

Figure 1:
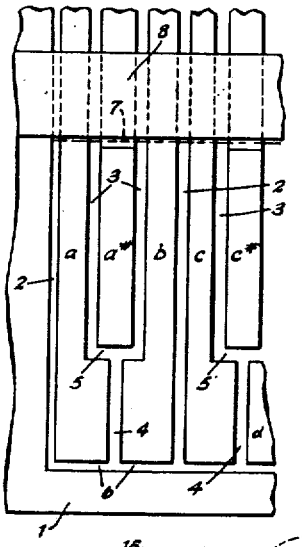
Figure 2:
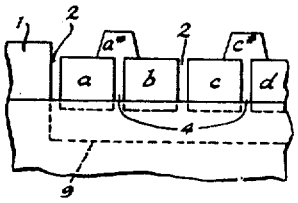
Figure 3:
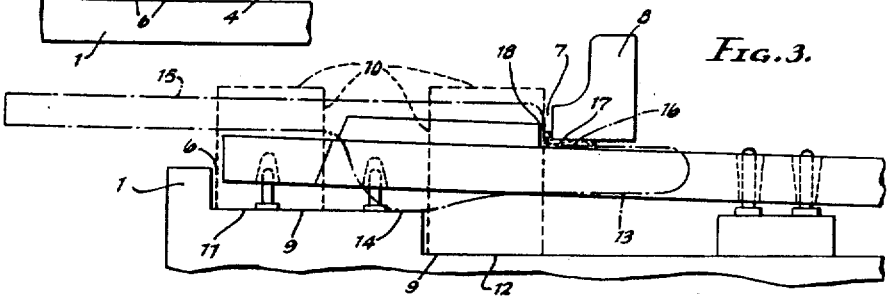

Referring to the drawings in detail:

In Figs. 1–3 host casing structure 1, ordinary host white keys a, b, c, d, etc. and ordinary host black keys a♯, c♯, etc. present, in somewhat exaggerated width, long seams 2, short rear seams 3 (all portions of front to rear seams rearward of the black fronts being hereinafter referred to as $$\frac{\text{oct}}{12}$$

seams), short front seams 4 (all portions of front to rear seams forward of the black fronts being hereinafter referred to as $$\frac{\text{oct}}{7}$$

seams), short transverse seams 5, long transverse seam 6, and channel 7, the latter being designated by the long and short dash line on Fig. 1 and comprising the openings between the rears of the black ivories and the front face of the usual fall-board or riser 8. Spacer structures in the form of fins, ribs, wires, or etc. may extend into any of said seams or channel to prevent displacement of superstructure from which they depend, whether or not they reach key bottom 9 (Figs. 2, 3) so as also to act as support struts. In either case dilution of the load on individual spacers and of consequent wear on host structure is effected by use of a sufficient plurality of them, their thickness, at least in the case of any at non-terminal portions of their superstructure, advantageously being nevertheless made so slight as not to impose any noticeable braking effect on adjacent host keys during the latter's reciprocation.

Dash lines 10 on Fig. 3 represent one form of such spacers, adapted to exert upward support merely by resting on host key bottom structure as at 11 or 12. Another form, indicated by dot-dash line 13 on Fig. 3, operates in the manner of a lever by fulcruming on the key bottom as at 14 and carrying an auxiliary keyboard (not shown) forwardly thereof, e. g. over the vicinity of 15, so that the weight of such keyboard and/or pressure upon it in use is countered by the bearing-up or prying-up of portion 16 under riser 8, e. g. via the usual host felting 17. Hook portion 18 serves to prevent rearward displacement during use by bearing against the front of said felting, as more clearly shown in Fig. 17 below.

Figure 4:
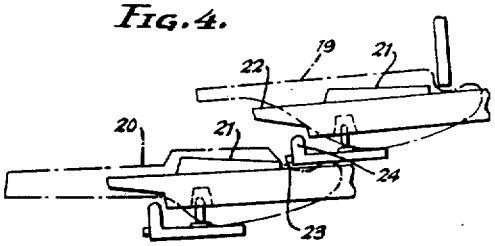

In Fig. 4 the parts are essentially the same as in Fig. 3 except for usual differences between plural manual pipe organ keyboards and keys and those of single manual instruments, also except for the slight variances in outline of lever fins 19 and 20, as compared with each other and with 13 of Fig. 3. But the rearward sloping of black ivories 21, the projection of upper whites 22 over the rear of the lower manual, the presence of pistons 23, and the absence of key bottom structure directly beneath the front ends of the white ivories introduce factors having a bearing on the choice of those elements or combinations within the invention which will present the widest adaptability for use with host instruments generally, on the one hand, or with particular categories thereof, on the other. Thus it is notable that pistons 23 as a gang may serve as a backstop for a keyboard placed on fins 20, or the rear of such a keyboard may be sustained by suspension, e. g. via hooks, from riser 24 and/or selected white keys 22, the latter advantageously being locked in up position in such case, e. g. after the manner of key 42 in Fig. 12 of '424.

Figure 6:
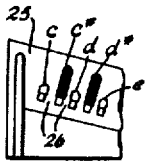
Figure 5:
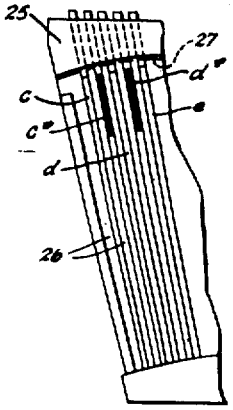
Figure 7:
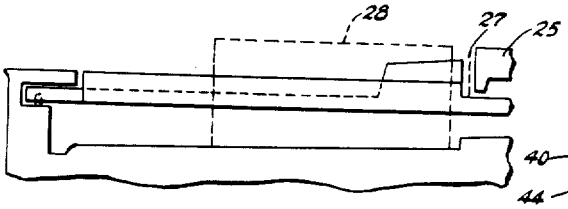

Figs. 5–6 are adapted from "Fig. 50," and Fig. 7 from "Fig. 49," appearing on pages 210 and 209 of The Contemporary American Organ, by W. H. Barnes (4th ed., 1948), said "Fig. 50" being therein designated as showing the "Measurements of Standard A. G. O. Pedal Board" ("A. G. O." standing for American Guild of Organists). In said Figs. 5–7 analogies to above numbered parts of Figs. 1–3 will be readily apparent, e. g. of casing structure 25 to 1, of seams 26 to 2–4, and of channel 27 (Figs. 5, 7) to 7. A simplifying factor however is the absence of unsymmetrical white key front structure, while a complicating factor is the existence of extra large spaces between e and f pedals and b and c pedals (said spaces being dealt with in Figs. 82–86 below).

Dash line 28 on Fig. 7 represents the same sort of spacer support as 10 on Fig. 3.

In Fig. 8 rectangular areas 29 and 30 represent locations where the scaffold type of support generally is suitable, although the host key bottom depth under 29 ordinarily will be greater than under 30 and may vary considerably more from one host instrument to another. As a rule the scaffold type of support will also be available under 31, though not as suitably in the case of overhanging pipe organ manuals as where there is key bottom structure underlying the entire front portions of the host white keys. But for locations such as 32, other types of supports, e. g. lever fins like 13 (Fig. 3) or floor based frames such as 232 in Fig. 56 of '424 are needed.

Figure 9:
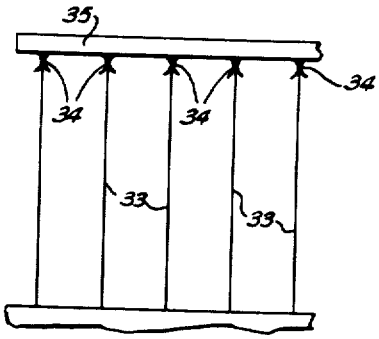
Fig. 9 is a front elevation detail of a scaffold type of support using a multiplicity of thin ribs or fins, motionless in use and adapted to reach down through host manual seams to act as spacers and/or struts.

In Fig. 9 scaffold type fins 33 detachably depend from squeeze lips 34 on the under side of superstructure 35. Where 35 is non-shiftable the spacing of fins 33, if less than an octave apart, may embody the slight variances customarily existing among host chromatic seam to seam distances. But where 35 is shiftable, exact $$\frac{\text{oct}}{12}$$

spacing is desirable, though with use of material sufficiently yieldable to allow for feeding the fins into the seams, irrespective of such variances.

Superstructure 35 (or other analogous parts of the invention) optionally may be in segments, each having one or more of the fins, and a supply of the latter in assorted dimensions can be provided. Or, readily shearable stock (e. g. of Vinylite) can be used for the fins, to make possible ready fabrication of them at the time of use, in whatever exact dimensions may be needed.

Figure 10:
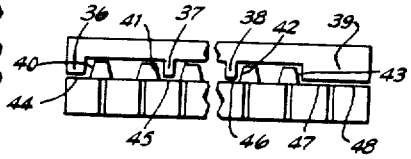
Fig. 10 is a front elevation detail of a type of support that is generally analogous to that of Fig. 9 but which uses thicker ribs to reach down into space alongside host black ivories and overlying host white ones.

In Fig. 10 ribs 36, 37, 38 and 39, similar to parts 103—106 of Fig. 26 of '424, are adapted to serve both as spacers (via juxtaposition along sides 40, 41, 42 and 43 of host black ivories) and as base supports (via resting on host white ivories 44, 45, 46 and 47—48). If desired, spacer fins can depend from lower edges of the ribs 36—39 into host oct
12 seams.

Figure 11:
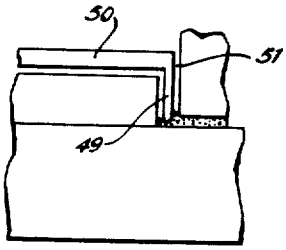
Figs. 11–12 are end elevations of devices for combinedly transmitting collective hold-up force of chromatic sequences of both black and white host keys to support platforms.

In Fig. 11 rear flange 49 of platform 50 extends longitudinally of the host manual in channel 51 (like 7 of Fig. 1) so as to receive the full collective hold-up force of all host keys underlying it. Advantageously 49 is sufficiently thin (ordinarily about ⅛ inch or less will do) to fit loosely in 51 and be readily liftable out of it.

Figure 12:
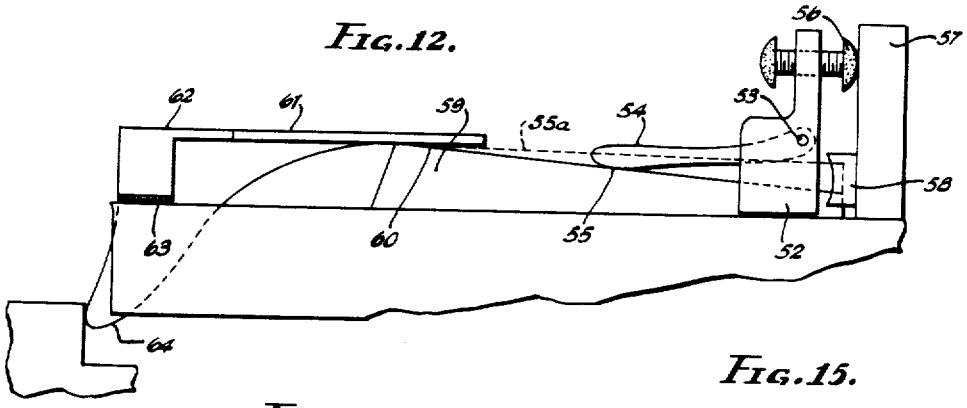
Figure 13:
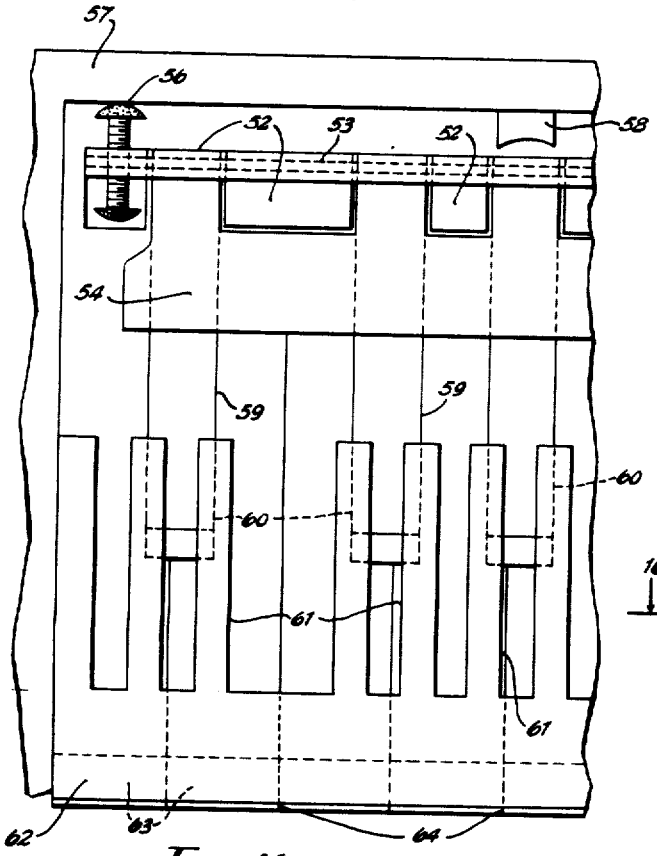
Fig. 13 is a plan of Fig. 12.

In Figs. 12–13 the bottom of frame 52 rests on the rears of host white ivories but is arched (understood) in the manner of housing 405 of Fig. 88 below, though sufficiently to clear the tops of the host black ivories rather than make contacts analogous to 417 of that figure. Swingably pivoted on axle 53 carried by 52 is a flap-like support platform 54 adapted to rest freely on the tops of the host black ivories as at 55 (Fig. 12), if the latter slope rearwardly, or at the level of dash line 55–a if they do not. Consequently any superstructure placed on 54 will receive collective hold-up force from all of the host keys (both black and white) underlying it. Cushioned screw knob 56 permits adjustment of front to rear placement, with host riser 57 optionally used as a rear stop and host pistons 58 optionally cleared.

Rested on the tops of the front portions of the host black ivories 59, as at 60, are finger portions 61 of a front support platform 62 which seats on the fronts of the host white ivories as at 63, while depending from 62 into oct
7 seams are spacer fins 64.

Portable keyboards may be based on either or both of platforms such as 54 and 62 and thus receive collective key-return force support from the keys of the host manual in particularly efficient manner.

Figure 15:
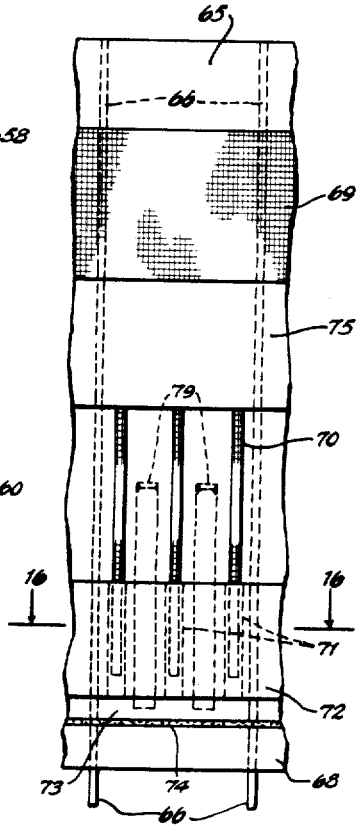
Figs. 14–15 are end elevation and plan of a pair of support sections, adapted to be mutually overlapped to give any of a variety of overall front to rear dimensions.
Figure 16:
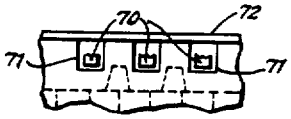
Fig. 16 is a diagrammatic section on the line 16—16 of Fig. 15.
Figure 14:
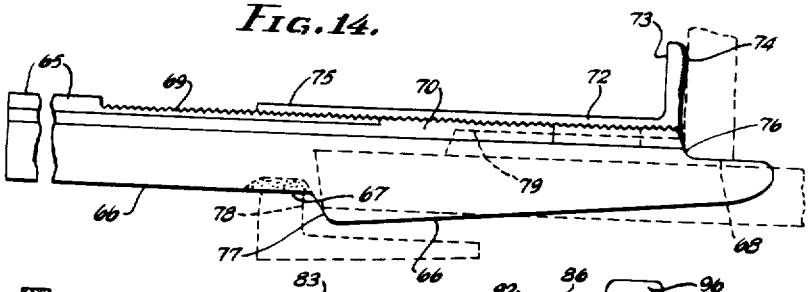

In Figs. 14–15 front platform 65 is affixed on lever fins 66 (whose widths are exaggerated in Fig. 15) which are cushion-fulcrumed on host front rail 67 (Fig. 14) to bear up against the underface of host riser 68. A rearward portion 69 of 65, as well as fingers 70 extending rearwardly therefrom, has roughened or serrated top surfacing, the fingers being adapted to reach into sleeves 71 (Fig. 16) of a separable rear platform 72, riser 73 of which is adapted to impinge against host riser 68 via cushion contact 74. The under surfaces of 72 and of a forward counterpart 75 of it (72 and 75 being rigidly united by end frame structure not shown) are roughened or serrated complementarily to the upper surfaces of 69 and 70. The said intersleeving may be effected prior to installation of the platforms, the ensemble then set in position over a host manual by feeding fins 66 into host e—f and b—c seams until hook portions 76 (Fig. 14) on their upper surfaces abut riser 68, platform 72 then moved rearwardly until contact is made at 74, and finally platform 65 pulled frontwardly as far as desired, e. g. until hook portions 77 of fins 66 move from the intermediate position shown in Fig. 14 into abutment with area 78 of the inner face of front rail 67.

During the installation the keys of the host manual will suffice to support the platforms rearwardly of front rail 67. And after installation such support may be derived from weighting forwardly of 67 and/or locking of the parts due to said pressures at 74 and 78, coupled with the anti-slip effect of the interfitting serrations (or any equivalent means) weighted with portable keyboard structure.

Room for transposer key downpushers to contact host ivories is left in the space surrounding host black ivory fronts 79 (Fig. 15).

If desired, upward extensions (not shown) of fins 66 may rise from and just forwardly of hook portions 76 to act as or carry riser structure disposed for serving as a rear stop for riser 73 in place of host riser 68, thus eliminating the contact with the latter at 74 and in fact obviating all need for contact with host casing at points above portions 76.

Figure 17:
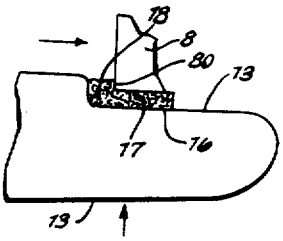
Fig. 17 is an enlarged detail showing a portion of the host structure of Fig. 3.

In Fig. 17 parts are given the same numbers as they have in Fig. 3, except that 80 is added to designate the area of the lower portion of the front face of host riser 8 which resists rearward displacement of portion 18 of fins 13 and consequently of any structure affixed to them.

In Figs. 18–20 oct
7 strut-spacer fins 81 resting on host key bottom 82 carry front cap 83, while oct
12 spacer fins 84 (Fig. 20) along with a terminal one 85 (the latter shown as spaced to fit into the terminal treble c seam of the usual 88- or 61-note host manuals) depend from rear cap 86. Windows 87, 88 in the fins 83—85 serve to sustain support platforms 89, 90 while internally screw threaded apertures 91, 92 in solid upper portions of the caps receive complementarily screw threaded member 93 (a like one at the bass end being understood) adapted for adjusting the front to rear spacing of the caps so as to create a bracing of the ensemble between the point of contact 94 of cushion 95, carried by 86, with host riser 96 (Fig. 19) and the area of contact 97 of fins 81 with host front rail 98 (Fig. 19).

Optionally means (not shown) analogous to 93 can be provided to squeeze host keys against their front guide pins and thus convert them into supports for portable manuals by locking them in their up positions. E. g. portions of fins 81 below window 87 can be thickened and screw threaded so as to receive a right and left screw link disposed transversely to 93 and adapted, on turning, to urge the rightmost pair of fins 81 to the left and the leftmost pair to the right. A further such link for fins 84—85 can be provided to supplement the desired effect. The operation of the links will be on the principle of clamp 52 of Fig. 16 of '424, with the fins exerting a squeeze force analogously to fingers 50, 51 thereof.

In Figs. 21–22 the bracing effect achieved in Figs. 18–20 is obtained via self-adjustment of the terminal portions of the supports themselves, on the principle of an "inside" caliper. Thus, in Fig. 21 front cap 99, carried by front oct
7 fins 100, and rear cap 101, from which oct
12 spacer fins 102 depend, are hinged as at 103 and so proportioned that, when set in place on a host manual, the weight of cap 101, augmented by any load placed on platform supports 104, 105 (analogous to 89, 90 of Fig. 20) will effect a bracing between the contacts of fins 100 with the host front rail (understood) and the contact of cap 101 with the host riser (understood). Block 106 represents an optionally elevated form of base support suitable for sustaining auxiliary independent key boards at levels sufficiently above host ones not to interfere with playing on the rears of the latter's ivories.

In Fig. 22 gang 107 of oct
7 fins (analogous to fins 100 of Fig. 21) and fins 108 (caps analogous to 99 and 101 of Fig. 21 being omitted from the drawing) are axled at 109, with a platform support 110 suspended by hooks 111 depending from 108 over the rear of the host manual. The weight of 110 and its load (understood) serves to press cushion 112, carried by fins 108, against host riser 113 as indicated in the drawing, thus automatically effecting bracing as aforesaid, though between the riser 113 and the rears of the hooked front portions of host white ivories as at 114 rather than the inner face of the host front rail. The usual host keys' frontward component of arcing in use will obviate friction at 114.

Conventional means can be added as desired, to supply supplemental security to the angular adjustments between caps 99 and 101 of Fig. 21 and/or fins 107 and 108 of Fig. 22.

In Figs. 23–24 standard 115 is shown with shank 116 (Fig. 24) sleeved into it, apertures such as 117 being provided for receiving fastening means to fix the elevation of screw assembly 118 at a selected height. Pins (understood) passing through the apertures can serve also to fix the angular position of the shank in its sleeve. Further adjustability can be effected by operation of cushion tipped screw 119. Erection of a standard 115 and its associated parts on each end of a portable support frame will provide an alternative to screw means such as 93 of Figs. 18–20 for limiting the closeness of the frame to a host riser. Optionally apertures such as 117 can be adapted to receive a fastening tool analogous to that shown in Fig. 55 of '424, with the applications of the vernier scale principles developed and referred to in that case availed of to obtain delicate adjustments of the elevation and angular position of assembly 118.

In Figs. 25–27, $$\frac{\text{oct}}{12}$$

lever fins 120 spaced at octave (or multiple octave) intervals along a host manual (only token gangs of the host keys being included in Fig. 27) readily permit chromatic shiftability wholly irrespective of any $$\frac{\text{oct}}{12}$$

seam-to-seam variances within the host octave. Consequently, with a transposer keyboard (not shown) integrally united to front platform 121 (comprising area 32 of Fig. 8) and rear platform 122 (comprising area 29 of Fig. 8) or also to the tops of fins 120 therebetween, and with flex fingers such as 10 of Fig. 3 of '424 used as levelizers, the ensemble can easily be handled as a single unit and installed merely by feeding the rears of the fins 120 into host $$\frac{\text{oct}}{12}$$

seams corresponding to any chromatic degree of transposition desired. Optionally individual supplementary fins or finned supports can thereafter be inserted, e. g.

$$\frac{\text{oct}}{7}$$

ones along and underneath the forward portion of the ensemble.

By virtue of the rearwardness of the fulcruming at 123 (Fig. 26) and the use of $$\frac{\text{oct}}{12}$$

fins only, for the unitary ensemble, it will readily and interchangeably fit upper pipe organ manuals such as exemplified in Fig. 4 and piano-type manuals such as exemplified in Fig. 3.

If abnormal down pressure should be exerted at the rear of platform 122 resistance to uptilting provided via the host riser bearing against the rears of the fins as at 124 (Fig. 26), coupled with general rigidity of framework of the ensemble etc., will tend to counter it. Or, restricting of the tr. ivories' rears to locations forward of the front of 122, as exemplified in a number of the later figures, will preclude any tendency to such up-tilting.

Rigid longitudinal under facings or tie members such as 125 (Figs. 25–26) and/or portions 126 (Figs. 26, 27) can be used to enhance the collective bending resistance of the fins, so long as ample space is left for tr. keys' downpushers to function.

Slots such as 127 in terminal portions 128 (Figs. 25, 27) may be provided to receive fastening means, e. g. of the sort illustrated in Fig. 30 below, for tying a tr. keyboard frame to platforms 121, 122, in cases where the latter are used to provide a fixed foundation for a shiftable tr. frame, complementary gangs of the slots arranged in exact accordance with whatever $$\frac{\text{oct}}{12}$$

seam to seam variances may happen to exist within the host octave being contemplated in such case (though not shown in the drawings). When thus used the platforms can just as well be supplied with any desired number of $$\frac{\text{oct}}{12}$$

fins and/or $$\frac{\text{oct}}{7}$$

fins, i. e. as distinguished from having only one per octave or multiple octave.

It may be noted at this point that sacrificing of host keys is not greatly disadvantageous where they underlie terminal portions of the tr. keyboards. So it is feasible to give extra strength via extra thickness to terminal or near-terminal support fins, i. e. as long as they are kept thin enough to be fed into the host seams without forcing adjoining host keys into down positions (which would lead to sympathetic vibration difficulties in pianos, or unwanted tones in organs).

In Fig. 28 webs 129 carried by rearward portions of long seam fins 130 are adapted to slip under host riser 131 and overlie the rears of host b, c, e and f ivories analogously to parts 131, 132, of Fig. 29 of '424. Any upward or tilting stresses will be distributed over a wider area by the webs, thus minimizing wear on the usual felt undersurfacing of the riser.

In Fig. 29 support 132 is shown as optionally based on host side cheek structures 133 via cushion contacts 134, lengthwise extensibility being symbolized by cushioned screw assemblies 135. Ribs 136 are indicated to provide spaces 137 for tr. keys' downpushers. Downward extensions (not shown) from 136 and/or tr. frame fins can be provided to penetrate host key to key seams and insure against horizontal displacement of a tr. frame positioned for use on 132. Optionally cushion contacts 134 can be made on up-locked host ivories rather than host end cheek structure, in manner brought out above and in '424. Suitable longitudinal and/or vertical extensibility means, e. g. analogous to those shown in Fig. 13 of '512, can be adapted to vary the overall dimensions of the Fig. 29 support frame and/or analogous other structures of the invention.

In Fig. 30 slot 127 and part 128 have the same significance as the similarly numbered parts in Figs. 25 and 27, while complementary slot 138 in tr. frame terminal portion 139 serves to receive fastening means 140 for tying the tr. frame to the fixed frame as already detailed above in the description of Fig. 27.

In Fig. 31 the breaking of the dash line rectangle depicts the fact that in some embodiments of the invention the levelizers are affixed to the tr. key bodies, while in others they are wholly separate. Analogously, the dot-dash line rectangle signifies that the equalizers may operate either directly on the levelizers or directly on the tr. key bodies, the levelizers transmitting the equalization to the tr. keys in the former case, and the tr. keys carrying or resting on the levelizers in the latter case. Moreover, the tr. keys frame and the base frame may either be separate or unitary, but if separate with only the tr. frame being shiftable in $$\frac{\text{oct}}{12}$$

increments along the host manual.

Fig. 32 needs no description other than already given or to be made apparent below in the description of key actions suitable for its variously located auxiliary keyboards.

In Fig. 33 rocker member 141 is pivotally connected to flexure 142 at 143, the flexure being fulcrumed to transposer frame structure (not shown) at 144, while roller 145 is analogously carried by an adjacent flexure (understood), the flexures respectively being provided with humps 146, 147 for receiving down pressure from tr. keys 148 respectively transmitted to host white and black keys via said rocker and roller contacts. These contacts, similarly to those of the flex fingers of '424, serve to minimize wear on the host ivories, while the hump contacts can be made practically totally wear resistant by suitable choice of materials, e. g. nylon.

Placement of 141 farther forward than 145 allows for the fact that host white key levers are generally fulcrumed forwardly of host black ones. Windows 149 in the tr. keys permit placement of a collectively upheld up-stop member 150 through them as shown, to penetrate and be sustained by the full bench of tr. keys. When individual ones of them are depressed, seating of the host keys beneath them on the key bottom occurs before the top of the window has descended to the point of impinging on 150, and on release of the keys springs 151, depending from the tops of the tr. keys' windows and compressed on 150 during the depression of the keys, aid in effecting their return to initial position.

In Fig. 34 the sloping of the under side of tr. key downpusher 152 permits automatic adaptation of a given tr. ensemble to hosts with non-standard black ivory front heights. That is, the further rearward the ensemble comprising the downpushers is set, the higher those operating on host black keys will ride, while the seating of flex fingers such as 153 or other downpushers on host white ivories will be unaffected (the exact angle at which flexed fingers such as 154 loosely rest on host black fronts being of no consequence).

In Figs. 35–37 swing levers 155 and 156, axled above a host rear manual at 157 (Fig. 35) by prior art structure (not shown), to thereby receive an approximation of drop equalization (though not a preferred form of it since they are permitted no drop at all at their rears) serve as levelizers for tr. white key 158 and black key 159. Except for variations incident to the difference in the locations of their downpusher rollers 160, 161, the levelizers are identical, so that tr. keys 158, 159, also being identical except for their ivory tops, can be interchangeably placed in position on either. When this is done, rearward displacement is limited by levelizer structure at 162, as well as by pegs 163 rising from the levelizers to seat in recesses 164 of the tr. keys and/or vanes 165 rising from the levelizers and 166 depending from the tr. keys, respectively fitting in slots 167 of the tr. keys and 168 of the levelizers. A further function of the pegs and/or vanes is to secure unsymmetrical tr. keys against any tipping about their long axes during their down travel, or in case of continued off-center finger pressure on them after their host keys have struck key bottom. This function may also be served by locating the upper surface of part 169 (it and 170 being collectively sustained up stop members such as 150 in Fig. 33) a tr. ivory drop distance below the white tr. ivories' front undersurfaces.

Window 171 serves merely to lessen the weight of the tr. keys. Design in this and other respects may generally follow principles developed in '424, e. g. in connection with the key of its Fig. 18.

By uniting members 169 and 170 to each other at their ends and providing $$\frac{\text{oct}}{12}$$

spacers on them, a full bench of tr. keys can be handled as a unit and placed in desired position on a bench of the levelizers merely by setting it down, collective seating of the pegs and/or vanes in their respective recesses and slots taking place automatically, or substantially so, in the process.

In use the tr. keys simply ride up and down as motionless passengers, gravity or finger pressure holding them in form-fit contact with the levelizers during down motion, and host key return force doing the same during up motion, the latter being limited either by cessation of momentum or by upstops 169, 170.

The just described principle of action of the Fig. 35 cradled or two-ply key, whereby equalization of the upper ply is derived solely from that of the lower ply, via form-fit contact etc., is the same as that which keeps the intercontacting of ivory 81 and equalizer "handle" 86 of Fig. 15 of '135 continually unbroken, and also resembles that which maintains continuous intercontacting of upper key structure 25 and filler finger 23 of Fig. 6 of '424. The functions of the peg and/or vane devices (163—164, 165—168) of Figs. 35–37 can be served by any means which will secure the upper plies against tipping about their long axes. E. g., in Fig. 38 interengagement of a tongue 172 extending from tr. key body 173 with recess 174 in levelizer 175 across the full width of both will serve the same purpose, installation being readily effected merely by suitable manipulation of key body 173 or of a bench of such key bodies. In that case upstop 176 can be joined at each end to a rear upstop corresponding to 170 (Fig. 35) and springs such as 177, shown as depending from the underside of windows 178 (to serve the same purpose as 151 of Fig. 33) be also provided above the rear upstop.

The cradled key action principle of Fig. 35 will be further exemplified below, e. g. in Figs. 50, 73 and 82, but in general it is interchangeable (though with correlative and more or less self-evident advantages and disadvantages) with the flex finger levelizers of the invention, or with suitably adapted prior art levelizers.

Figure 48:
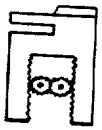

Figs. 39–49 provide a graphic index of the adaptation of various forms of key actions and parts to the purposes of the invention, as follows:

| Type of action | Detailed adaptation |
|---|---|
| Fig. 39 | Figs. 43; 24; and 24a of '424. |
| Fig. 40 | Figs. 50–58; and 80–81 below. |
| Fig. 41 | Figs. 59–61 below. |
| Fig. 42 | Figs. 62–65 below. |
| Fig. 43 | Figs. 66–72 below. |
| Fig. 44 | Figs. 73–79 below. |
| Fig. 45 | Figs. 80–81 below. |
| Figs. 46, 47 | Text below. |
| Fig. 48 | Fig. 33 of '135. |
| Fig. 49 | Figs. 82–86 below. |

In Figs. 50–58 levelizers 179, 180 are host-key supported near their rears at downpusher contacts 181, 182, and at their fronts by springs 183 based on front fixed frame structure 184.

$$\frac{\text{Oct}}{12}$$

fins 185 and/or long seam fins 186 (Figs. 50, 56), optionally reinforced by rigid partitions 187 (Fig. 50) extending transversely to them, unite 184 and fixed frame rear structure 188 so that the levelizers are held loosely captive by the frame structures with ample freedom nevertheless for their reciprocation during use. Frame parts 189 (Fig. 50) and 190 (Figs. 54, 50) need not be so low as to act as levelizer upstops, their essential purpose being merely to serve as caging structure during non-use and installation. Front spacer partitions 191 (Figs. 57, 52, 50) and rear spacer partitions 192 (Figs. 55, 54, 52, 50) preserve the $$\frac{\text{oct}}{12}$$

spacing and co-alinement (i. e. side-to-side parallelism) of the levelizers, while security against axial displacement is provided by frame structure at 193 and 194.

Vanes 195 (Figs. 58, 50), whose position at the start of installation of a shiftable bench of tr. keys 196, 197, about to be described, is indicated by dash lines in Fig. 58, function similarly to pegs 163 and vanes 165 of Fig. 35 or tongue 172 of Fig. 38, i. e. as tr. key stabilizers, by fitting fairly snugly in the narrowed frontward portions 198 of slots 199 in the tr. key bodies (Figs. 58, 50).

Said bench of tr. keys, corresponding to the tr. keys of Fig. 35, is held loosely captive by collectively up-held front upstop 200 from which $$\frac{\text{oct}}{12}$$

spacers 201 depend (Figs. 56, 51), the latter serving to maintain $$\frac{\text{oct}}{12}$$

spacing and co-alinement of the fronts of the tr. key lower portions 196–a and to co-ordinate the same with that of the levelizers beneath. United to upstop 200 by end frame parts 202, 203 (Fig. 51), is collectively up-held rear upstop 204, from which rise $$\frac{\text{oct}}{12}$$

spacers 205 (Figs. 53, 50) which either alone, or along with optional upper extensions 206 of 192 (Figs. 55, 54, 50), preserve oct
12 spacing and co-alinement of the rears of the tr. keys. Security against rearward displacement of the tr. keys is provided by rear frame structure at 207 and/or vanes 195, while close limiting of possible (but not normally likely) frontward displacement during use may be effected by extending front frame top portion 208 farther rearwardly so as to nearly abut the fronts of tr. key lower portions 196–a, Fig. 50).

Installation of the overall combination is effected by two simple movements: first, feeding the fixed frame support fins 185, 186 into their respective host seams to set the fixed support in place; and second, setting the tr. frame (constituted by upstops 200 and 204 united by parts 202 and 203) in the desired position along the fixed frame by slipping the rears of the tr. keys rearwardly under its portion 209 (Fig. 50) until they reach 207.

Springs 183 may be of any suitable strength, but not ordinarily much in excess of the key return force exerted by the host keys. Placement of the springs forwardly of the fronts of the tr. white ivories enhances their equalizing effect but requires increased frontward extension of the *levelizers'* [levelizers] framework. Equalization also may be enhanced by locating downpusher contacts 181, 182 farther rearwardly and/or the rears of the tr. ivories farther forwardly, though with increase of action weight in the former case and either shortening of tr. ivories or increase of their frontward extension in the latter.

In Figs. 59–61, oct
12 fins 210 re-enforced by partitions 211 transverse to them are part of a unitary frame composed of front portion 212, optionally further united by end pieces (not shown) to rear portion 213, on which are respectively fulcrumed front levers 214 and rear levers 215 in mutually parallel disposition. The drop of tr. keys 216, pivoted to said levers as shown in the drawing, consequently is equalized. The fulcrums 217, 218, may both take the form of 217 in Fig. 60, while the pivots 219, 220, may take the forms, respectively, of 221 in Fig. 60 and 222 in Fig. 61. Downward extensions 223, 224 rigidly depend from tr. keys 216 to seat on cushion contacts 225, 226, while cushion con[tacts]*tact* 227 runs the entire length of the bench of tr. keys to arrest any tipping of such keys in case of continuance of off-center pressure after their normal downward journey is concluded.

The significance of other elements in Fig. 59 will be self-evident in view of what has been said relative to earlier figures. It may be noted however that springs 228 are shown as optionally affixed on the upstop 229 instead of depending from window top structure of their respective tr. keys.

Optionally the levers could be positioned closer together so as to permit of setting the tr. keys farther rearwardly, since in this form of key action pressure on portions of tr. ivories rearwardly of fulcrums 218 (i. e. over area 29 of Fig. 8) has very little tendency to cause tipping of the frame, despite absence of directly underlying base support. For this reason reversing the disposition of the levers so that they arc frontwardly instead of rearwardly is not presently preferred.

Figure 46:
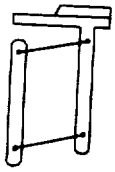

Placement of the levers in vertical arrangement analogous to that indicated by Fig. 46 is not presently preferred either, in view of the added overall height incident thereto.

Figs. 62–65 exemplify use of the same general type of equalization means as shown in Fig. 28 of '135 and also as involved in various known lazy-tongs or analogous mechanisms of other arts. Consequently reference to those sources can supply basis for supplementing or varying the structures of these figures or the following description of them.

In Fig. 62, X-piece, i. e. crossed levers, equalizer assemblies 230, operatively sleeve-anchored to tr. frame structure as at 231, 232, are similarly anchored to under portions of each tr. key by structures 233, 234. The tr. frame is based on fixed frame structure 235, 236 which is supported in any suitable way, e. g. in manners described above. Downpushers 237 extend through openings at 238, 239 in the arms of the X-pieces. Displacement of the tr. keys is resisted by frame walls 240 (at the front) and 241 (at the rear), respectively adjacent to which downstems 242, 243 of the tr. keys reciprocate. Positioning of the rears 244 of the ivories forwardly of area 29 of Fig. 8 lessens or entirely obviates need for fixed frame support directly beneath that area, besides leaving ample operative space for white keys 245 of an overhanging upper manual.

In Fig. 63 downpushers 246 are shown as optionally passing through the X-piece levers forwardly of their intersections 247, while in Figs. 64–65 such intersections, 248, 249, are depicted as staggered (to permit greater axle or pivot dimension (Fig. 65)), also as optionally equipped with return springs 250, 251 based on tr. frame structure 252 (Fig. 64). In the Fig. 65 modification the fronts 253 of the black tr. key X-piece levers do not extend forwardly as far as those, 254, of the whites, so that additional width is available at 254 to receive down pressure from unsymmetrical white tr. key ivories at an intercontact (understood) corresponding to that at 233 (Fig. 62). Modification of front frame and tr. keys design to adapt them to the embodiments of Figs. 63–65 can readily be made. In this connection it will be noted that the openings for the downpushers, as at 255, 256 (Fig. 63), 257, 258 (Fig. 64), and 259, 260 (Fig. 65), need not be staggered in any of the embodiments.

Oct
12 spacers such as hereinbefore described may be supplied where desired, e. g. in wells 261, 262 (Fig. 62), and supplemental intermediate vertical guide means may be provided for the X-piece intersection structures 263 (Fig. 62), 247 (Fig. 63) and/or 248, 249 (Figs. 64–65) analogous to down stem 207 of Fig. 28 of '135 and the vertical walls of sound trap 209 which limit its reciprocation to a vertical path. Excess tr. key drop may be prevented e. g. by seating of anchorage structures 233, 234 respectively on 231, 232.

In Figs. 66–69, which involve the crank-like type of keys of, e. g. Fig. 45 of '512, Fig. 14 of '135 and Fig. 44 of '424, illustrative black tr. ivories 264 with necks 265 and white tr. ivories 266 with necks 267 (Fig. 68) receive rearward support from host manual keys via nonflexed fingers 268 or downpusher contacts 269, and front support from anchorage pivot channels 270 in which anchor elbows 271 are held closely yet with enough freedom for rotative play. Shanks 272, rigidly interconnecting said elbows and necks, are uniformly canted as best seen in Fig. 67, so that on depression of the tr. ivory from which the neck depends its drop will be equalized, irrespective of the locus of finger pressure along its length, i. e. in the same way as the down motion of a handle of a crank is equalized. Although a degree of cant is used which will be sufficient to permit shanks, elbows, etc. (if made of metal or other rigid material) to resist any noticeable deformation during use, downward projections 273 (shown only in Fig. 66) are provided to seat on lower front frame structure 274 at loci corresponding to crank bottoms 148 of Fig. 43 of '512 as security against vigorous continuation of finger pressure on the tr. ivory after the host key depressed by it has come to rest on its key bottom 275.

Upper front frame structure 276 may be firmly united with 274 in any suitable way, with mutually complementary scallops in each serving to provide the pivot channels 270, and 274 may be joined to rear casing structure 277 by oct
12 support fins 278 and/or end frame pieces (not shown). Collectively upheld front upstop 279 is equipped with canted oct
12 spacer fins 280 (Figs. 67, 66), and optional key return springs 281 are supplied to bear up under enlargements 282 at the junctions of necks 265, 267 and shanks 272.

Oct
12 spacers (not shown) such as 280 may depend from collectively upheld rear upstop 283 and/or vertical oct
12 pins 284 (Figs. 66, 69) in the rear portion of casing structure 277 and passing through apertures 285 in the rear portions 286 of the tr. keys may be relied on for keeping the tr. ivories in exact co-alinement. Strengthening collars 287, 288 are carried on the anchor elbows 271 and move with them through the slight amplitude of rotative motion incident to reciprocation of the tr. keys. Bearing surfaces of pivot channels 270 advantageously are of nylon. Lips 289 serve for shields as well as ornaments. Upstemming of shanks 272 at 290 elevates elbows 271, thus decreasing the height of the tr. ivories above their fulcrums and consequently reducing the slight horizontal component in the amplitude of their reciprocatory path.

Advantages of the Fig. 66 tr. keyboard include the optional lowness of its ivories and their placement entirely forward of area 29 of Fig. 8, whereby ample operative space is left for overhanging upper manual keys such as 291; also the provision of a shelf 292 which, lying frontwardly of both the tr. and the host manuals, may extend beyond either or both ends of the usual host keyboard any distance necessary to overlie and conceal all the anchor elbows. Also, the total area of bearing friction in the tr. key actions is much reduced, e. g. as compared with the key actions of Figs. 59 and 62. Cushioned screw knobs functioning like 368 of Fig. 81 (below) may be supplied for security against excessive down pressure on the shelf 292.

In Figs. 70–71 shanks 293 (corresponding to 272) are shown as having anchor elbows 294 pointed rearwardly instead of frontwardly. This design lessens the frontward dimension of front casing structure. For added strength however elbows 294 may take the form of rearward extensions of elbows 271 so as, with suitable adaptation of parts, to furnish anchor elbows extending both ways from their junctions with the shanks in the manner indicated by the farthest dash line to the right in Fig. 34 of '135.

In Fig. 72 anchor elbows 295 are disposed so that their axes of rotation are at an angle with axes of the tr. ivories. In this design the latter, while consequently having lessened side-to-side component of arcing, exhibit a slight front-to-rear one along with it.

In Figs. 73–75, which involve the double-shanked type of crank-like equalizers exemplified e. g. in Figs. 15, 22–24 of '135, anchors 296, sleeve-fulcrumed in pivot channels 297 (corresponding to 270 of Fig. 66) optionally formed by securing of scalloped bars 298, 299 (Fig. 73) on complementarily scalloped walls 300, 301, provide axes of rotation for shanks 302, 303 which axes are parallel to those of tr. ivories 304, 305, a first gang of the latter being cradled on levelizers 306 (Figs. 74, 75) rigidly uniting the shanks. Correspondingly, anchors 307 (Figs. 74, 75), sleeve-fulcrumed in pivot channels 308, provide similar axes of rotation for shanks 309, 310 united by levelizers 311 (Figs. 73–75) carrying a second gang of the tr. ivories (304, 305). The necks or stems (not all of which are numbered) at the shank-to-levelizer and shank-to-anchor junctions provide for reversely disposed double tiering and clearancing of the parts in action on the general principles exemplified in '512 and '135.

The action of Figs. 73–79 will be particularized after the following description of the upper portions of Figs. 73 and 76–79, plus the manner of installing the ensemble:

Tr. frame front part 316, comprising upstop 317 and oct
12 spacer fins 318, is united by end members (understood) to tr. frame rear part 319 which comprises upstop 320 and oct
12 spacer fins 321, the tr. frame being collectively upheld via said upstops. Tr. keys 304, 305, co-alined by said spacer fins and cradled on levelizers 311 and 306 similarly co-alined, have rearward extensions 322 (Figs. 73, 78, 79) which reciprocate in openings 323 in the rear wall 324 of the fixed frame, such frame comprising front wall 325, walls 300, 301, connecting parts 326, 327 and end faces (understood) uniting them, plus any suitable support structure, optionally fins 328, 329 also united to 326, 327 (Fig. 73).

Stabilizers in the form of vanes 330 extending upwardly from the levelizers and sleeved into recesses 331 of the tr. keys (Fig. 73) provide security against tipping of tr. keys on their axes besides cooperating with the inner faces of frame parts 316 and 325, at the front, and 319 and 324, at the rear, in supplying insurance against axial displacement of the tr. keys or levelizers.

Spacer webs 332 on rear wall 324 (Figs. 79, 78, 74) insure against sidewise displacement of tr. key and levelizer rear parts 322, 333, 334, 335 (Figs. 79, 78, 73), while crank bottoms 336, 337 (Figs. 79, 73, 74) function in manner described above relative to Fig. 66.

Front wall 325 has oct
12 spacer webs 338 (omitted from Fig. 75) to insure co-alinement of levelizer front parts 339, 340 (Fig. 74), and crank bottoms 341, 342 (Figs. 75, 73, 74) analogous to 336, 337.

The first of the two steps for installing the Fig. 73 ensemble consists of feeding fins 328, 329 into their corresponding host seams and setting the fixed frame in operative position. Levelizers 311, held loosely captive at the front by front wall ceiling 343, crank bottoms 341, 342 and webs 338, and at the rear by rear wall ceiling 344, crank bottoms 336, 337 and webs 332, thereupon take their level from that of the particular host ivories on which gravity has caused their downpushers 345, 346 to come to rest.

The second of said two steps consists of placing the tr. frame in a selected transpositional position over the fixed frame via merely feeding its tr. keys' rear extensions 322 into the corresponding openings 323 in fixed frame rear wall 324, the tr. keys meantime having been held loosely captive by tr. frame parts and spacers in manner analogous both to that just described in connection with levelizers 311 and that described above in connection with levelizers 179, 180 and tr. keys 196, 197 of Fig. 50.

When a tr. key downpusher forces the host key beneath it to seat on host key bottom the stabilizer action of vanes 330 and/or the upper surface of upstop 317 corresponds to that of analogous parts in Figs. 35 and 50.

The location of upstop-plus-springs assembly 347 midway along the levelizers and keys, as well as directly above the area of the downpusher contacts, gives good balance to their action despite use of only one such assembly.

It will be understood that in each tr. manual sectional unit or segment, where the tr. manual is composed of a plurality of such, all levelizers bass-ward of the location of vertical walls 348, 349 (Figs. 75, 79, 74) will have shanks of the 302, 303 tier, while all those treble-ward thereof will have shanks of the 309, 310 tier. Due to this reverse (double) tiering none of the full bench of shanks will need to extend into space beyond the ends of the full manual of tr. ivories. Analogously, by using less cant for the shanks and/or by shortening their anchors, all extensions of equalizer parts to the front or rear of the tr. manual can readily be dispensed with as well. (The only reason for the rearward extension of such parts in Fig. 73 is that the optional locating of the rears of the tr. ivories forwardly enough to preclude substantial finger pressure over area 29 of Fig. 8 makes the space available anyhow.)

In Fig. 80 flex fingers 350, 351 are shown as optionally of relatively large size. Equalizing of the drop of the tr. keys 352, 353 carrying them is provided for, so far as the portions of the tr. ivories forward of them is concerned, via springs 354 and associated parts, in manner already described in connection with springs 183 of Fig. 50. And equalizing of the rearward portions of the tr. ivories is provided for by stems 355, extending integrally upwardly from the tr. keys in individual guide sleeves constituted by walls 356, 357 in tr. frame riser 358 (united to tr. front frame structure 359 by end pieces (not shown)) and oct
12 partitions (understood) serving as spacers for the stems.

Enlargements 360, 361 serve to localize the shifting pivot rub areas.

The ensemble is unitary and is installed by feeding spacer fins 362 into selected host seams, at least the non-terminal ones of these fins optionally being distributed at intervals of even octaves. Support for the ensemble is shown as optionally provided solely by the collective holdup force of the host black keys at 363 and the host white keys 364.

On principles set out in '512, the length of stems 355 advantageously exceeds the horizontal distance between their axes and the downpusher contacts, preferably being 1½ to 2 or more times that distance.

In Fig. 81 further vertical stems 365 are supplied to supplement the equalizer action of stems 355 and springs 354, thus making possible corresponding lessening of the height of riser 358. A tr. frame front rail 366, replacing front frame structure 359 of Fig. 80, in such case provides guide sleeves (understood) for the stems 365. Springs 367, corresponding to 354 of Fig. 80, then may be used mainly if not solely as tr. key return aids.

Adjustable cushioned screw knob 368 provides security against undue frontward down pressure as at 369, by bearing against host front rail 370.

Principles of action of stems such as 355 and 365 are further described both in '512 (in re its Figs. 52–60) and '135 (in re its Fig. 6).

In Figs. 82–84 levelizers 371 (Fig. 83) resting on host white pedals 372 and levelizers 373 (Figs. 83, 82) resting on host black pedals 374 are blocks (e. g. of wood, light metal alloy, plastic or the like. and hollow if desired) contoured to reciprocate readily in chutes presently to be described. Resting on the levelizers are tr. white pedals 375 and tr. black pedals 376. Held loosely captive in a fixed frame comprised of front structure 377 and rear structure 378 united by end faces (understood) and spacer partitions 379, the levelizers not only provide a common level for tr. downpusher contacts but also, via the varied angles from the vertical and correspondingly varied thickness of the partitions, particularly at 380 and 381, present the same at exactly $$\frac{\text{oct}}{12}$$

intervals.

Corresponding partitions 382 (Fig. 83) in tr. frame 383 (Fig. 84), via analogously varied thickness, particularly at 384 and 385, restore the extra large spaces between host e and f pedals and host b and c pedals referred to in the description of Figs. 5–6 above, while grooves 386 in the tops of partitions 379, complementary to beads 387 on the bottoms of partitions 382, lend security to the seating of the tr. frame on the fixed frame.

Installation is effected by first setting the fixed frame in position and then placing the tr. frame (comprised of partitions 382 and end faces (understood) uniting front structure 388 and rear structure 389 so as to hold the tr. pedals loosely captive) in selected transpositional position on the fixed frame. Spacer fins 390 (Fig. 82), e. g. being merely downward extensions of partitions 379, need not reach to host pedal bottom, as the collective hold-up force of the host pedals will be ample to sustain the ensemble.

The displacement preventing functions of other elements shown in Figs. 82–84 will be apparent in view of the descriptions of the Figs. 50 and 73 cradle type tr. key actions and ensembles, and the self-evident analogies between them and the instant tr. pedal action and ensemble.

In Figs. 85–86 host black pedal 391 (e. g. the b flat one of Fig. 83) is shown as sustaining levelizer 392 and white tr. pedal 393 within a chute 394 formed by partitions 395—398. Foot pressure on the tr. pedal forces it, 392 and 391 downward, while host pedal return force reverses the process on release of the pressure, rubbing on the side walls of the chute being optionally countered by rollers 399, and on the end walls (formed by front and rear fixed frame and tr. frame structure (understood), e. g. such as that at 400, 401, 402, 403 in Figs. 82, 84) by rollers 404.

For simplicity of presentation minor variations of design to take into precise account the curvature factors involved in the A. G. O. standard radial keyboard of Figs. 5–6 have been omitted. It will be appreciated also that the exact dimensions, proportions, contours, number, etc., of the tr. levelizers and pedals are not critical.

In Figs. 87–88 housing 405, arched to seat on or overlie rearward portions of host black ivories 406 and resting on host white ivories 407, contains $$\frac{\text{oct}}{12}$$

compartments 408 which may contain electric switches such as identified in '512 for use e. g. with the analogous auxiliary manuals of its Figs. 13, 64. Electrical connections are provided in cable 409. Ribs 410, formed by the arches, supplement the spacer action of fins 411, the latter being spaced to be fed e. g. into host b—c and e—f seams (numbered 2 on Figs. 1–2). The slanting of compartments 408 betokens the increase of switch length which can be achieved thereby. To the same end, rearward tipping of the switches and/or increasing of the height of the housing can be availed of.

Web 412 (Fig. 87) is made thin enough (e. g. about 1/32") to slip under the usual host pistons 413. Security against rearward displacement is supplied by the contact of the web with host riser 414 at 415 and/or the contact at 416 (Fig. 87). Or both such contacts can be dispensed with, as where the rearward slope of black ivory tops of particular hosts is such as to require frontward adjustment of the housing in order for the arches to seat on them at points of contact 417. Alternatively shims or wedges can be placed on the black keys to make up for such sloping, and/or the design of rear wall portion 418 (Fig. 87) can be varied so as to make it abut the host pistons as a gang, thus using them for a backstop. Or the lower rear portions of the housing can be weighted to enhance stability.

It may be remarked at this point that placing the center of gravity of the auxiliary keyboards of the invention rearward (and below) their longitudinal axes is generally desirable, not only for such stabilizing effect but also because the collective host key return force, if used for support purposes, becomes greater the closer to the line of the host key fulcrums the load is placed.

In Figs. 89–91 auxiliary keyboard 419, positioned similarly to manual 244 of Fig. 64 of '512 and supported e. g. by floor-based structure (not shown) such as that of Fig. 56 of '424, is provided with spacer fins 420, 421 extending rearwardly from its frame into seams of host manual 422 after the manner referred to in the first paragraph on page 36 of '424. Strength is imparted to the group of fins by longitudinal tie piece 423 (Fig. 90), analogous to 125 of Figs. 25–26 and optionally supplemented by tie partitions (not shown) such as 126 of Figs. 26–27.

Equalizers 424, serving the ivories of the bass half of 419 (typified by 425, 426), and 427, serving those of the treble half (typified by 428, 429), are essentially similar to the equalizer of Fig. 36 of '135, except that they have double shanks and are sufficiently long to make provision for any axial slip of their anchor pivot members 430, 431 wholly needless. Horizontal anchor sleeve structure 432 (Fig. 91), corresponding e. g. to 155 of Figs. 23–24 of '135, is provided to hold the pivot members in place, while the load carrying ends 433, 434 are operatively connected via links 435, 436 to hammer action levers of bass piano 437 and treble piano 438 (Fig. 90).

If desired, the sounding boards, etc, of said pianos may be separate units, or they may be bridged together (e. g. just under the middle of their keyboard 419) analogously to the tines of a tuning-fork.

The hammer actions optionally may be disposed either forwardly of the links or rearwardly of them, making use in either case of conventional designs appropriate thereto, and the vertical or other dimensions of the sounding boards, strings, etc., as well as the contours and arrangement of their frames to e. g. leave the pedal-board accessible to a player's feet, can be varied as desired. Damper and soft pedal mechanisms for each of the pianos may respectively be co-linked for unitary operation by single damper and single soft pedals.

It will be noted that in the drawings the midspace directly rearward from organ bench 439, i. e. between it and host manual 422, is free from any structure that might impede a performer in playing simultaneously on both of the manuals and the pedalboard too, since the only thing in that space is keyboard 419 and its vertical thickness is so little as to make it itself entirely unobstructive to such playing.

In Figs. 92–93 pilot fin 440, depending from a mid-portion of tr. frame 441, is positioned to be readily steered into any of the oct
12 seams of a mid-portion of host key board 442. Thus, while the user is grasping the frame at each end he conveniently can guide it into selected position merely by using said oct
12 seams as per se a transposition index, and feeding the pilot fin into the one which will give the desired degree of transportation. Since the vertical plane of the fin is the same as that of a tr. keyboard oct
12 seam at 443 above it, this will insure accurate placement of the tr. ivories above the host ones to be respectively operated by them.

The strut-base fixed frame 444 appearing in Fig. 93 may consist of one or more long units or a number of short ones, distributed along the host manual in manner to provide auxiliary or reserve support under the front portion of tr. frame 441 when seated, and having front wall 445 adapted to penetrate host seam 446 (corresponding to long transverse seam 6 of Figs. 1, 3) and rest on host keybottom 447. Because of the forward component of arc of conventional white keys 448, wall 445 should ordinarily be quite thin. Horizontal displacement is prevented and strength added by oct
7 strut fins 449.

In Fig. 94 under frame 450, along which tr. frame 451 may be thought of as having been preset in desired transpositional relationship, carries pilot rib 452 (analogous e. g. to ribs 36—39 of Fig. 10 above) to be steered into the space separating the rear portions of host black ivories 453 and 454. Since the rib will always occupy that space or one of like size, a snug (but non-binding) fit can be given it so as to afford security against displacement of the tr. ensemble longitudinally of the host manual. It will be noted that the axis of rib 452, the seam between the white keys immediately above, and the seam between the white keys immediately below, will all be in a common vertical plane during use, thus insuring accurate relative placement of the tr. and host key action parts.

Provision for use of the same principle is exemplified in Fig. 95, wherein oct
12 index slits 455 in fixed rear support platform 456 as well (optionally) as oct
12 index slits 457 in fixed front support platform 458 all lie in common vertical planes with the oct
12 host seams respectively underlying slits 455 (host parts being indicated by dash lines).

In Fig. 96 bed 459 of carrying case 460 contains oct
12 seams 461 to receive and protect whatever oct
12 spacer fins may depend from auxiliary keyboards placed in the case. To facilitate feeding of the fins into such seams the latter optionally may extend forwardly alongside analogous oct
7 seams 462. Apart from the use of such seams in the bed, the design of the case may be varied as desired, to suit the particular keyboard to be transported or stored in it.

Before proceeding with the description of Figs. 97–100 it may be pointed out that if ordinary piano ivory tops, both black and white, were all in the same horizontal plane, it would be very simple to use them directly as underlevers (i. e. without any need for levelizers) for a shiftable bench of tr. keys placed over them. Thus, downpushers 345, 346 of Fig. 73 e. g. could be merely downward extensions of the tr. keys and could all be made to reach down just to that plane. Also, the lower tips of the downpushers could well be made to form a common straight line longitudinally of the keyboard (especially if the under levers were all to be fulcrumed equidistantly rearward). In such case the under levers could be made as short and/or canted as desired, because they would not need to carry the ivories or serve as ivory drop equalizers as do ordinary key levers.

Similarly, any other key returners, e. g. springs or rod-like under links held to vertical axial reciprocation by suitable guide means, could be disposed to present upper surfaces in a common horizontal line immediately subjacent that of the downpushers' tips. And in all these arrangements the bench of key returners could be made stationary while that of the tr. keys could be made freely shiftable in accordance with the degree of transposition desired. During such shifting the level of the downpusher tips would be maintained constant, e. g. via suitable anchoring if the bending variety of crank or swing arm equalizers were used, or by having the upper faces of the key returners wide enough to preclude downpushers (floating on them) of other varieties of equalizers from dropping between them during the shifting of the tr. bench.

The foregoing simplification of design, wherein all need for a bench of levelizers is inherently dispensed with, is contemplated for Figs. 97–100.

In those figures casing or console end structures 463, 464 (Fig. 97) contain housings 465, 466, each e. g. an octave in length, within which ends 467, 468 of tr. keyboard 469 are horizontally sleeved for either bass-ward or treble-ward shiftability. Between the console end structures, and immediately subjacent the tr. keyboard is a nonshiftable bench of key returners 470. On a mid-portion of the frame carrying the latter is a frontwardly extending tr. index ledge 471 containing oct
12 openings 472 adapted to receive tr. pin 473 after tr. lip 474, jutting forwardly from the tr. keyboard and containing opening 475, has been brought into alinement above a desired one of the openings 472 and the pin 473 has then been inserted in openings 475.

In Fig. 100 rollers 476—478 are depicted as optional aids to the shifting of the tr. keyboard, a like installation of such rollers being intended in the treble housing 466. When such rollers are used the horizontally axled ones, such as 477 and a corresponding one in treble end housing 466, take the place of surfaces 479, 480 (Fig. 97) in providing base support for the frame of tr. keyboard 469.

Many variations of the Figs. 97–100 ensemble can of course be made. E. g., if see-saw type under levers are used any need for double tiering of them can be obviated by canting the treble half of their bench treble-ward after the manner of levers 133 of Fig. 42 of '512, and the bass half analogously bass-ward, while providing openings at a suitable level below surfaces 479 and 480 to accommodate the more outlying levers needing to extend therethrough. And when the Fig. 80 or Fig. 81 type of tr. key action is used, longitudinal openings in housings 465, 466 can be provided to permit horizontal shifting of tr. frame parts such as riser 358 (Fig. 80) and/or front rail 366 (Fig. 81) therethrough.

Instead of using a single pin such as 473, provision can be made for using a plurality of them, e. g. rigidly united to each other and spaced say an octave apart.

In the case of organs the pedalboard can be roller-based so that on shifting of tr. keyboard 469 the pedalboard can be shifted an equal distance, its electrical connections being broken and reset in the process via use of known electrical organ transposer devices, to effect the same degree of transposition on the pedalboard as on the manual.

It will be manifest that with slight design modifications of host instruments special provision for optional supporting of auxiliary keyboards on or along them can readily be made, e. g. via widening of key seams of terminal portions of the keyboards so that they will accommodate thicker support fins and/or selection of optimum contours for the key beds so that they will be best adapted to act as bases for the fins. And even with conventional host instruments as they are it may be desired to remove (or block up) key levers in terminal octaves to provide basing for end housings such as 465, 466 of Fig. 97. Or such housings can have an ample number of strut fins, e. g. three or more, for penetrating host seams of such octaves so as to sustain the housings even though the latter project beyond the ends of the host manual into space such as occupied by cushioned screw assemblies 135 in Fig. 29. In either case the housings can be firmly supported at their rears, so that the rears of the tr. ivories can be made to lie farther back than those of Fig. 73, if desired in almost the same vertical plane as that of the rears of the host ivories.

In the latter event the housings advantageously can be provided with rollers such as those of Fig. 100, especially if no lifting of the bench of tr. keys is required in order to shift it relative to the host manual. Need for such lifting can be obviated by using, as in Fig. 73, a fixed bench of levelizers (its frame optionally being integral with said housings) and a shiftable bench of cradled-type tr. keys but in place of interengaging stabilizer parts (such as shown in that figure or Figs. 35–38), for safeguarding the tr. keys from tilt about their longitudinal axes, making use of front and rear stems and sleeves analogous to 82—85 of Fig. 15 of '135. In other words, stems and guides which may equally well be described as corresponding to 355—357, 365 of Figs. 80–81 hereof, except with much shortened lengths, can be used. In such case the shortening of the lengths is made possible by the fact that the function of preventing tilt about a transverse axis is independently served by the equalizer mechanism of the levelizers.

With the embodiment just described the bench of tr. keys advantageously can comprise up to an octave more keys than the host keyboard, with the bench of levelizers comprising the same number of octaves as the latter and with transposition being effected merely via horizontal roller-based shifting of the one bench relative to the other, i. e. with no need for any lifting, and with locking at the desired transpositional position being effected by pinning as described above in connection with Figs. 97–99.

In effecting the space economies of the invention it should be borne in mind that the functions of (1) ivory drop equalizing, (2) auxiliary tone actuator element contacting, and (3) key returning may be served by a variety of different means or combinations of means. E. g. there may be separate or auxiliary benches of devices for each, as when ivories or keys of one bench depress separately based coil springs of a second bench until electrical connections are made via auxiliary contact elements of a third bench; or there may be only two such benches, as when the key return force is supplied solely by inherent springiness of a bending type of ivory carrying equalizer, or by the weight of a hammer action operating on an under lever. Or, where the only tone actuator contact elements are inbuilt ones, there may be only one such bench, as e. g. in the case of equalizers 424, 427 of Figs. 89–91 wherein the ivory drop controlling, the contacting of inbuilt tone actuator elements and the key returing are all accomplished via unitary key levers. For purposes of transposition in accordance with the invention, however, it is essential that there be at least two relatively shiftable benches, one comprising the ivories and the other tone actuator elements to be operated by them.

At this point it may be noted that a number of the space economies of the invention are equally available whether or not transposition is provided for. E. g., the overall front-to-rear dimension of keyboard 419 of Figs. 89–91 (i. e. the distance between the vertical plane of the line of white ivory carrying fronts and that of the line of the load carrying rear ends of its equalizers 424, 427) can readily be made less than say 1½, 1¼ or 1⅛ the length of its white ivories, merely via appropriate fixing of the cam of the equalizers; while analogous shortening of such dimension in a quite different species of embodiment is illustrated in Fig. 6 of '135.

In selecting dimensional ranges or ratios for action and support parts the typical variety of spatial relationships of auxiliary to host manuals depicted in Figs. 31, 32 may be kept in mind, as well as the various types of action indicated in Figs. 39–49 and in the parent cases. In the latter connection it may be pointed out that in view of the limited size or size range of the ivory contacting areas of human fingers generally, no special problem of drop equalizing is presented for ivories whose front to rear dimension is less than say 2 or 1½ inches. That is, mere use of a coil spring (or of a pair of them as in Fig. 47) will ordinarily provide a more or less suitable action in such case. Or actions such e. g. as those of Figs. 6–7, 8–9, 12, 15–16, 26–28 and 34–36 of '512 may be selected. (When the piston type of ivory of said Figs. 6–7 is used it optionally can be given a downward axial component as indicated in the lower rear auxiliary keyboard of Fig. 32 above.)

But for ivories say 2, 2½ or 3 inches or more in length, actions such as those of Figs. 39–48 hereof (particularly 39, 40, 43, 44 and 45, and increasingly so as the ivory length increases) are preferred. And in the more preferred actions of the invention it will be found that the equalizer means for such ivories comprises at least one pivot or fulcrum which is removed a substantial distance from the space occupied by the ivory capped portion of the key in its up position as well as from the space imaginarily traversed by translational movement of the rear face of such space directly rearward indefinitely or interminably. Said distance may e. g. be at least equal to the overall vertical dimension or depth of said space at the ivory rear, or equal to the width, or say ½ or twice the width of the ivory rear or of the cross-section of the key structure underlying it, or may be at least ¼, ½ or fully equal to the ivory length, the pivoting effect being transmitted to the ivory via a substantially rigid member which is resistant to torque about its longitudinal axis or to stresses that would tend to tilt the ivory about its transverse axis. Moreover, the equalizers are pivoted in such manner as to impart drop to the ivory rears along paths, such as particularly designated hereinabove, rather than along conventional forwardly arcuate paths.

It will be noted that in the crank species of equalizers the "handle" portion needs to be elbowed, necked or stemmed upwardly or downwardly at the junction with its shank portion in order to provide ample shank to shank clearance in use without necessitating unduly rearward locating of the anchors or pivots. The extent of the elbowing, necking or stemming advantageously is at least sufficient to reach a horizontal plane ⅛ (better 5/32, 3/16, ¼ or more) inch vertically removed from the horizontal surface on said handle nearest to it. And in the "sliding cane" species of e. g. Fig. 6 or '135, as well as in the case of short stems such as 82, 83 of the same figure, there is a similar elbow, neck or stem, although it continues in a straight line so as to reciprocate along its vertical axis instead of being elbowed a second time to provide for crank-like reciprocation. Whether the crank or the sliding cane species be used, for equalizing the drop of the long axis of the ivory, the overall vertical dimension of the space required for key movement, directly beneath the ivory, will (except for any portion of such space which may happen to be occupied by said elbow, neck or stem) be only as much as the amount of ivory drop provided for. This, e. g. plus use of the flex finger levelizers of '424 and/or space economies such as exemplified in the key of Fig. 18 of '424 or the white tr. keys of, say, Figs. 66 and 50 hereof (wherein the vertical thickness of the entire extent of the widened ivory-carrying front portions of the white tr. keys may be less than ½ or ⅓, or even less than ¼ the maximum vertical thickness along the key), makes readily possible the reduction of the overall vertical dimension between the planes of tr. black ivory tops and host black ivory tops to less than 2½ or 2, or even less than 1¾ or 1½ inches, i. e. while nevertheless retaining the novel tr. ivory rear drop characteristics of the invention. And when the key returners are not keys of pre-built host instruments, but rather e. g. springs or under levers such as lever 14 of Fig. 6 of '135, the combined thickness of key bottom or under structure, e. g. such as 32 of said figure, as well as of said levers or springs, can easily be made small enough for the overall depth of the front of the keyboard, from the top of its black ivories (in the up position) to the undersurface of its casing, to be less than the usual standard white ivory length, or less than 5, 4, 3 or even 2½ inches.

Figure 47:
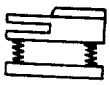

When non-tr. auxiliary keyboards having white ivory lengths of say 2 to 4 inches are used, e. g. in the loci of the front or upper rear keyboards of Fig. 32, crank-type keys such as those of Fig. 49 of '512 may be found particularly suitable, especially if the key returner means are located under both the front and the rear of the ivory, e. g. as indicated in Fig. 47 hereof. Such division of the load makes possible a shank of less thickness than otherwise, therefore less canted and more space-saving. Embodiments of this type of action (or of e. g. the Figs. 39, 40, 43, 45 types as well) make conveniently possible an overall auxiliary keyboard height, from the under surface of its frame to the top of its black ivories, that is well within the limits specified in the last sentence of the paragraph next above.

It may be mentioned here that in both the crank and the sliding cane species of actions the location of the load (or the average location of it) as a rule advantageously is at least ½ (better ⅔ and preferably ⅘) as far along the handle from the aforesaid neck, stem or elbow, as the end of the ivory. And where the load is divided, e. g. as in the said combining of the Fig. 47 sort of action with one of the type of Fig. 49 of '512, this test may roughly be applied as though there were two handles, one the portion of the handle forward of the neck and the other the portion rearward of it.

In regard to the size or size range of the angle between the axis of rotation at the anchors of crank-type keys or equalizers and their shanks (cf. Figs 70–72) or ivories (as well as to other items of novelty herein) analytical treatment, description, or disclosure of subject matter in claims, heretofore presented by applicant in the prosecution files of the parent applications, is intended to be in effect incorporated herein the same as the disclosures in the specifications and drawings of said parent applications themselves are.

Whether or not the aforesaid axis of rotation is parallel to the axis of the ivory, bifurcation of the downpushers can be obviated, if desired, by omitting portions such as those of anchors 296 of Fig. 73 which, as indicated by dash lines thereon, pass through its downpushers 345, 346.

Before proceeding with dimensional and other data relating to preferred embodiments of auxiliary keyboard supports and accessories, several definitions will be useful. Thus, when the expression, ivory "topped," "capped" or "carrying" portion of a key is used, it is intended to include parts of such keys that continue frontwardly and/or rearwardly beyond the ends of the finger contacting portions or "ivory" caps, e. g. the rearmost parts of tr. keys 158, 159 of Fig. 35 or the forwardmost parts of keys 352 of Fig. 80; so that when reference is made e. g. to the drop at "the rear of the front to rear axes" of ivory topped portions of keys, it means the drop at rearmost parts such as those of said keys 158, 159 (i. e. in case they extend rearwardly beyond the rear ends of the ivory caps).

The expressions "treble" and "bass," as used herein to designate portions of keyboards or supports, include up to the full right half and the full left half, respectively of such keyboards or supports.

There are quite a few dimensions and dimensional relationships and ratios in piano type keyboards that are standardized or substantially so, and a number of the limitations pointed to herein are based on or correlated to them. E. g. the "5/32 inch" limitation is based on the fact that, as applicant understands, said figure represents the minimum separation component, axially of the keyboard, between a pair of successive front pins thereof. Hence, for needles 196 of Figs. 48–49 of '424 to be fed horizontally rearward between them, the needles need to be less than 5/32 inch in width. And fins such as 13 of Fig. 3, above, need to be still thinner when they are to loosely or innocuously penetrate host key to key seams and be freely removable therefrom.

It is understood that the length of the usual 88 note piano manual is about four feet (which computes to approximately a $$6\frac{7.4+}{16}$$

inch octave length for the seven octaves beginning with lowest a and ending with highest g sharp); that the vertical thickness or depth of keys generally is about ⅞ to 1 inch; that their drop at playing position (i. e. corresponding to the line of the black ivory fronts) usually is a scant ⅜ inch; and that the standard weight of touch for organs, as adopted by the American Guild of Organists in 1933 and in force since then, is 4 ounces (cf. pages 238, 239 of the above cited 4th ed. of The Contemporary American Organ, by W. H. Barnes). Also, it is understood that the height of black ivory fronts ordinarily is about 7/16 inch above the level of the white ivories, and that the keybottoms generally are parallel to the plane of the white ivory tops and extend to a line 1⅝ inches rearward of the vertical plane passing through the frontmost points of the black ivories, whereas rearwardly of that line the depth of the keybottom will vary considerably from one instrument to another.

While there are slight variances in the widths of key to key seams and channels corresponding to those illustrated on Figs. 1–3, it will generally be found that when the pilot or spacer fins of the invention are to penetrate them freely, i. e. without exerting any braking effect such as to substantially impede the key actions, a thickness of 1/32 inch or less will suffice, although one of say 1/40, 1/32, 1/64 inch or even less may be preferred.

Whether the fins are to serve as spacers only or also as strut or "pry-up" lever supports, it is preferred to have a plurality of them between the loci of the terminal ones, or between the loci of whatever other structures may depend from an auxiliary keyboard or frame structure to supply support via contact with stationary host structure. And each terminal octave distance of about 6 7/16 inches of such keyboard or frame structure advantageously may be provided with a plurality of 2, 3 or more of the fins. (It is not intended that this latter test shall be considered met by a pair of the fins occupying seams an exact octave apart.)

The pilot spacers (whether thin fins or thicker ribs such as 452 of Fig. 94) preferably are located at least the distance of an octave from each end of their frame.

In order to withstand stresses which vigorous playing on piano or organ keys is apt to create, a plurality of at least three, four or five, and preferably more (e. g. two or three or more times as many) spacer fins is desirable, whether or not they reach down to host casing structure, i. e. where they are the only host structure engaging means on the auxiliary frames for countering such stresses. Advantageously, too, they will extend rearwardly under the host riser, to oppose up-tilting tendencies.

The vertical dimension of lever fins such as 120 of Fig. 26 will depend on the particular location desired for the auxiliary keyboard to be supported by them. And this of course will vary considerably, but will be at a minimum e. g. where the fins are placed in seams of an upper organ manual to provide support for a tr. type of auxiliary keyboard operatively disposed over the next lower manual of the organ. In such case the tr. keyboard will often be found useful as an aid to cross-spanning, whether or not used for transposing, i. e. for in effect raising the level of the lower organ manual, so that a performer can more readily play on both the organ manuals at once with fingers of a single hand.

Usually, however, and whether the fins be of the lever or the strut variety, they will desirably be at least 1½, 1¾, 1⅞ or 2 or more inches in depth, with choice of the exact depth depending on the particular type of auxiliary keyboard and the use to be made of it.

Should any problem arise from use of the tr. keyboards of the invention with host keyboards having black ivory heights that are non-standard at the point of downpusher contact, an alternative to the solution embodied in Fig. 34 above is to incorporate an upstop member such as 150 of Fig. 33 in the tr. keyboard, make the cross section of those of its portions overlying host whites circular but of those overlying host blacks elliptical or eccentric, rotate the member until it rests evenly on all tr. key parts immediately underlying it, and then make it secure against further rotation, e. g. via means such as 140 of Fig. 30 to bind end portions against frame end structure. (This alternative expedient of course is not applicable where said underlying parts do not float on or derive their elevation from hold-up force of host keys.)

As regards use of host ivories' hold-up force to sustain auxiliary keyboard ensembles generally, it may be noted that such force will ordinarily be adequate even though the weight include that of, or incident to tone producer actuation links such as the electrical connections in cable 409 of Figs. 87–88, or any of the electrical, mechanical or pneumatic links analogously disclosed in '512.

Where an auxiliary pedalboard, e. g. of the scaffold type and strut-fin supported, is placed over the rear of a host pedalboard, say in position corresponding to that of the upper rear manual keyboard of Fig. 32, such links may well be operatively connected to ranks of chime or other solo quality tone producers, or to bass fifths (i. e. 16-foot fundamentals coupled with the fifths respectively next above them) to yield "synthetic" 32-foot quality tones.

In connection with the auxiliary non-tr. keyboards of the invention generally it may be noted that provision for shifting the pitch of their tone producers to at least some extent may be useful in any case, i. e. even apart from transposer use per se, since the pitch of hosts will vary quite considerably from one instrument to another. The availability of prior art means for effecting such shifting via breaking and resetting of electrical connections has been spoken of above, but such means are by their nature limited to exact chromatic increments. This ordinarily requires tuning or voicing of either the auxiliary keyboard's tone producers or those of the host instrument, in cases where the discrepancy between them does not precisely equal a chromatic interval or multiple of such intervals. In consequence, use of tone producers that are susceptible of "at-the-console" pitch adjustment adequate to fully correct discrepancies of that sort is especially advantageous. At least two varieties of tone producers in this category are known to the art. Both involve the use of synchronous motors whose speed of rotation can be varied to modify the pitch. They are: (a) the variety which makes use of "magnetic tone wheels"; and (b) the variety which makes use of recorded tones (e. g. tones recorded on magnetic tape). It is pertinent to observe, too, that each of these varieties lends itself to use for purposes of transposition per se, since the quality of its tones does not appear to be impaired by raising or lowering their pitch in manner aforesaid a plurality of chromatic intervals.

Apart from instruments embodying said two varieties of tone producers there seems to be a substantially total absence of transposer instruments, whether in-built or auxiliary, on the present-day market, at least the domestic one. On the hypothesis that a major reason for this is presumed difficulty in regard to wear and noise of requisite action parts, it may be pointed out that just as the main force of a player's finger pressure is borne by key-bottom structure in the case of prior art actions, so it also is in the case of the key actions of the invention; also that whatever degree of friction is involved in use of the equalizers and guides of the invention, it derives merely from their functioning to urge the ivories, during the latter's drop, into courses that are rectilinear or nearly so. Such degree of friction appears to compare quite favorably with that occurring between conventional capstans and the first levers of ordinary piano hammer actions, or between the walls of the usual recesses in piano keys and the front and balance pins about which they reciprocate.

In counteracting the sort of friction in question, whether it be in the actions of the invention or in those of the prior art, material having at least an outer layer of anti-friction, wear resistant material on the order of nylon will be found useful. And if a particular species of key or pedal action presents a problem of noise, use of an appropriate sound-deadening medium, e. g. surfaced with nylon and optionally comprised within a sound trap as described in '135, is advantageous.

In view of the dearth of transposer instruments on the market, as above indicated, it seems pertinent to observe that there are a wide variety of commonplace situations, some of them of quite frequent recurrence, where an automatic, mechanical transposer keyboard is especially needed; e. g. for accompanying singers with colds or for whose voice registers the pitches of available copies of particular vocal works are unsatisfactory; or for duo work on instruments whose pitches are a chromatic step apart; or where a particular instrument has to be tuned so low, lest it fail to hold its pitch, that orchestral instruments are incapable of being tuned down to it; or for "single key" players; etc.

It will be appreciated too that many novel musical techniques and effects will be readily possible on plural manual organs where one or more of their manuals is equipped with one of the novel transposers of the invention; also that the work of composers and arrangers, as well as music teachers and students, can be aided very effectively via use of the transposers to enable them to produce music in any desired key, while merely reading it in its signature key.

Novel subject matter disclosed but not claimed herein or in parent applications S. N. 59,512, filed November 12, 1948, *now U. S. P. 2,675,730, dated April 20, 1954*; S. N. 120,135, filed October 7, 1949, *now U. S. P. 2,675,728, dated April 20, 1954*; and S. N. 138,424, filed January 13, 1950, is being claimed in continuational application S. N. 307,099, filed August 29, 1952.

*Use in claim 1 of the limitation "within 1 and ¼ inches below the plane which includes the upper surfaces of the white ivories of said keyboard" derives from the fact that the depth of the finger contacted portions of usual piano and organ key levers more or less approximates but seldom if ever attains 1 and ¼ inches.*

It will be apparent that many changes in the physical embodiments of the invention and its novel aspects may be made within the scope of the appended claims without departing from the spirit of the invention.

I claim:

1. In a console musical instrument having a piano type keyboard and support structure disposing it to clearingly overlie a player's knees during use: (a) a bench of piano type keys and drop equalizer means for the ivory of at least one of them, said means having a first leverage system comprising at least one rigid torque resistant member extending from contact with key structure which is secure during use against rotatory movement relative to the ivory in a vertical plane extending lengthwise thereof, to pivot structure which is stationary in use, is located forwardly of a vertical plane parallel to the transverse axis of the ivory and distant ⅔ the ivory length to the rear of the ivory, and is removed a distance at least equal to [the overall depth of said key structure immediately forward of its ivory rear] ¼ *the ivory length* from the space occupied [by the ivory topped portion of said key in its up position], *during the up position of the key, by structure which moves during use of said ivory, is located within 1 and ¼ inches below the plane which includes the upper surfaces of the white ivories of said keyboard, and is situate directly beneath the ivory of said key*, as well as from the space imaginarily traversed by translational movement of the rear face of such space, *in a direction parallel to the axis of said ivory*, directly rearward to said vertical plane, said equalizer means serving to [limit the drop of the ivory rear to a path all points of which lie further rearward than the frontmost point in the arc of a circle described by downward movement, through an amplitude whose vertical component equals that of the ivory rear in use, of the forward end of a radius whose said end coincides with said ivory rear in the up position and whose rear end lies in a vertical plane that includes and extends directly rearward from said forward end a distance equal to 2½ times the ivory length] *impart to the ivory rear, during use, a drop at least equal to ⅓ the maximum drop along the ivory*; (b) a second leverage system comprising an ivory motion transmitting lever which at least in part lies forward of the vertical plane that includes the rearmost point of said ivory and is at right angles to its axis; (c) tone actuator means; and (d) ivory returner means; said ivory motion transmitting lever being operatively disposed to transmit ivory down motion to said tone actuator means and to impart up motion to said ivory via operative association with said ivory returner means.

2. The instrument of claim 1 wherein said tone actuator means and said ivory returner means belong to a host keyboard a key lever of which constitutes said ivory motion transmitting lever.

3. The instrument of claim 2 wherein said ivory returner means comprises a hammer action which belongs to said host keyboard and is operatively associated with said key lever thereof.

4. In a piano type keyboard having ivories in chromatic sequence of twelve per standard octave length of about 6 7/16 inches, a white ivory drop equalizer mounted on fulcrum means comprising a non-yielding pivot located forwardly of the front of the front to rear axis of the ivory carrying portion of the equalizer, there being a forwardly extending connection between said latter portion and the portion of the equalizer contacting said pivot, which connection, at all points substantially rearward of the locus of said pivot, is rigid during use against flexing about any axis parallel to the keyboard.

5. An ivory drop equalizer comprising an ivory topped "handle" having an elbow portion extending to a point in a horizontal plane at least about 1/8 inch vertically removed from the horizontal surface on said handle nearest to it, said elbow portion being in union at said point with a shank extending therefrom a distance at least equal to 1/4 the ivory length, the union between the handle and the elbow being substantially rigid against flexing about any axis transverse to the long axis of the handle, and said shank terminating forwardly of the vertical plane that is perpendicular to said long axis of the handle and is situate one-half the ivory length rearwardly of the rear of the ivory; said shank also terminating rearwardly of the vertical plane that includes the rear of the ivory.

6. In a piano type keyboard, a series of keys arranged in chromatic sequence, said keys each being provided with equalizer means comprising at least one shank having a "handle" portion on which the key's "ivory" is carried, the longitudinal axis of said shank lying in a vertical plane which is at a substantial angle with the vertical plane in which the longitudinal axis of the ivory lies and said shank passing under portions of other keys of said series to anchorage structure providing it with a rotational axis whose vertical plane intersects that of the longitudinal axis of the ivory at an angle of less than about 75°, all portions of said shank during its up position being operatively clear of all overlying portions of said other keys during the latter's down position.

7. The series of keys of claim 6 wherein the vertical plane of said rotational axis makes an angle of less than about 45° with that of the longitudinal axis of the ivory.

8. The series of keys of claim 6 wherein the vertical plane of said rotational axis is approximately parallel to that of the longitudinal axis of the ivory.

9. The instrument of claim 1 wherein said torque resistant member and said pivot structure respectively correspond in action to the shank and the fulcrum of a crank.

10. The instrument of claim 1 wherein said torque resistant member is substantially vertically disposed and reciprocates in a substantially vertical path during use.

11. The instrument of claim 1 wherein said pivot structure is located forwardly of the line formed by the rears of the ivories of said bench.

12. The instrument of claim 1 wherein said first leverage system constitutes a crossed levers type of equalizer.

13. The instrument of claim 1 wherein said first leverage system constitutes a parallel levers type of equalizer.

14. The instrument of claim 2 wherein said ivory returner means comprises a spring which belongs to said host keyboard and is operatively associated with said key lever thereof.

15. The instrument of claim 9 wherein said drop equalizer means comprises two of said pivot structures and two of said torque resistant members, the latter being rigidly interconnected by key structure topped by said ivory, and being each operatively associated with one of said pivot structures.

16. The instrument of claim 11 wherein said pivot structure provides an axis of rotation for said torque resistant member that is transverse to the axis of said bench.

17. The instrument of claim 11 wherein said pivot structure provides an axis of rotation for said torque resistant member that is transverse to the axis of said ivory.

18. The instrument of claim 13 wherein the pivots of said parallel levers are horizontally spaced.

19. The instrument of claim 16 wherein said pivot structure is the fulcrum of a crank-type equalizer.

20. The instrument of claim 17 wherein said pivot structure is the fulcrum of a swing arm-type equalizer.

21. The instrument of claim 20 wherein said pivot structure carries a spring which intervenes between it and said torque resistant member, resiliently yields in response to down pressure on the front of said ivory, and on release of said pressure supplements the action of said ivory returner means.

22. The ivory drop equalizer of claim 5 which is provided with down motion stop structure at a locus approximately subjacent said elbow portion, thereby insuring against distortion of said equalizer consequent on prolonged finger pressure on said ivory topped "handle" during use.

23. The ivory drop equalizer of claim 22 in which said elbow portion is located approximately adjacent the rear end of said ivory, and which equalizer is provided with means for returning said "handle" to its "up" position following release of said finger pressure; said means contacting said "handle" at a locus at least 1/2 as far along said "handle" from said elbow portion as is the front end of said ivory.

24. The ivory drop equalizer of claim 23 wherein said elbow portion belongs to a crank-type equalizer.

25. The ivory drop equalizer of claim 23 wherein said elbow portion belongs to a sliding cane-type equalizer.

References Cited in the file of this patent or the original patent

UNITED STATES PATENTS

| | | |
|---|---|---|
| 367,955 | Braun | Aug. 9, 1887 |
| 758,760 | Kohlmoos, Jr. | May 3, 1904 |
| 904,730 | Scurfield | Nov. 24, 1908 |
| 1,004,350 | Bialik | Sept. 26, 1911 |
| 1,107,783 | Goss | Aug. 18, 1914 |
| 1,392,883 | Tow | Oct. 4, 1921 |
| 1,775,865 | Poeltl | Sept. 16, 1930 |
| 2,298,799 | McClintock | Oct. 13, 1942 |
| 2,562,673 | Larsen | July 31, 1951 |

FOREIGN PATENTS

| | | |
|---|---|---|
| 359,263 | Germany | Sept. 21, 1922 |
| 946,876 | France | Dec. 12, 1948 |
| 552,865 | Germany | June 18, 1952 |

UNITED STATES PATENT OFFICE

CERTIFICATE OF CORRECTION

Reissue No. 23,956 March 1, 1955

Harold A. Jewett

It is hereby certified that error appears in the printed specification of the above numbered patent requiring correction and that the said Letters Patent should read as corrected below.

Column 3, line 10, for "war" read --wear--; line 25, for " [tr.] " read -- [tri.] tr.--; column 7, line 64, for "width" read --widths--; column 24, line 6, for "can" read --cant--; line 28, for "Figs. 38-48" read --Figs. 39-48--; line 76, for "18 or" read --18 of--; column 27, line 83, for "in", second occurrence, read --is--; column 29, line 47, for "latter's" read --latters'--.

Signed and sealed this 12th day of April 1955.

(SEAL)
Attest:

E. J. MURRY
Attesting Officer

ROBERT C. WATSON
Commissioner of Patents